US012669780B2

(12) United States Patent
Fujisawa

(10) Patent No.: US 12,669,780 B2
(45) Date of Patent: Jun. 30, 2026

(54) MECHANICAL TIMEPIECE

(71) Applicant: SEIKO EPSON CORPORATION, Tokyo (JP)

(72) Inventor: Teruhiko Fujisawa, Shiojiri (JP)

(73) Assignee: SEIKO EPSON CORPORATION (JP)

(*) Notice: Subject to any disclaimer, the term of this patent is extended or adjusted under 35 U.S.C. 154(b) by 319 days.

(21) Appl. No.: 18/616,378

(22) Filed: Mar. 26, 2024

(65) Prior Publication Data

US 2024/0329600 A1 Oct. 3, 2024

(30) Foreign Application Priority Data

Mar. 27, 2023 (JP) ................................ 2023-049540

(51) Int. Cl.
*G04B 17/20* (2006.01)
*G04B 18/02* (2006.01)

(52) U.S. Cl.
CPC ........... *G04B 18/028* (2013.01); *G04B 17/20* (2013.01)

(58) Field of Classification Search
CPC ...... G04B 17/20; G04B 18/028; G04G 19/00; G04G 21/02; G04C 3/04; G04C 3/06
See application file for complete search history.

(56) References Cited

U.S. PATENT DOCUMENTS 4,533,257 A 8/1985 Kitano et al.
6,973,010 B1 * 12/2005 Koike .................... G04C 10/00 368/204
10,481,556 B2 * 11/2019 Buttet .................... G04B 17/02
11,300,929 B2 * 4/2022 Tombez .................... H03B 5/40
11,422,510 B2 * 8/2022 Tombez ................. G04B 17/06
11,480,925 B2 * 10/2022 Tombez ................. G04B 17/26
11,537,085 B2 * 12/2022 Born ........................ G04C 3/06
11,586,150 B2 * 2/2023 Surmely ................ G04R 20/26
11,687,041 B2 * 6/2023 Tombez ............... G04C 11/081 368/76
11,846,915 B2 * 12/2023 Tombez ................. G04C 3/047
(Continued)

FOREIGN PATENT DOCUMENTS

JP S59-109889 A 6/1984
JP 2005-106830 A 4/2005
(Continued)

*Primary Examiner* — Sean Kayes
(74) *Attorney, Agent, or Firm* — Harness, Dickey & Pierce, P.L.C.

(57) ABSTRACT

A mechanical timepiece includes a spring, a balance, an oscillation circuit, a speed governing mechanism configured to include a permanent magnet and a coil, one of the permanent magnet and the coil being held by the balance, an external magnetic field detection mechanism configured to detect an external magnetic field, a vibration detection mechanism configured to detect vibration of the balance and output a vibration detection signal, a speed governing control mechanism configured to output a drive pulse to perform processing for governing the balance, a power storage mechanism configured to store electric energy, and a generator configured to generate the electric energy. The speed governing control mechanism changes a processing content of the speed governing of the balance in accordance with a detection result of the external magnetic field.

11 Claims, 16 Drawing Sheets

(56) References Cited

U.S. PATENT DOCUMENTS

| | | | | |
|---|---|---|---|---|
| 11,868,092 | B2 * | 1/2024 | Tombez | G04C 3/047 |
| 12,429,827 | B2 * | 9/2025 | Takyo | G04C 3/04 |
| 2005/0036405 | A1 | 2/2005 | Born et al. | |
| 2020/0103827 | A1 | 4/2020 | Tombez et al. | |

FOREIGN PATENT DOCUMENTS

| | | | |
|---|---|---|---|
| JP | 2020-052047 | A | 4/2020 |
| WO | 2022-176453 | A1 | 8/2022 |

* cited by examiner

MECHANICAL TIMEPIECE

The present application is based on, and claims priority from JP Application Serial Number 2023-049540, filed Mar. 27, 2023, the disclosure of which is hereby incorporated by reference herein in its entirety.

BACKGROUND

1. Technical Field

The present disclosure relates to a mechanical timepiece including a balance.

2. Related Art

International Publication No. 2022/176453 discloses a mechanical timepiece that includes a rotor attached to a balance stem of a balance wheel driven by power from a power source and a coil, generates power by rotation of the rotor accompanying forward and reverse rotational movement of the balance wheel, outputs a speed governing pulse to the coil based on a rotation detection signal of the rotor, and controls the movement of the rotor.

In the mechanical timepiece of International Publication No. 2022/176453, the rotation of the rotor is detected by the voltage waveform generated in the coil. For this reason, in an environment in which there is external magnetic field noise, there is a problem in that the rotation of the rotor cannot be accurately detected due to the magnetic field noise being detected by the coil, and a deviation occurs in the time indicated by a pointer due to a speed governing pulse being output based on erroneous detection.

SUMMARY

According to an aspect of the present disclosure, there is provided a mechanical timepiece includes a spring, a balance configured to be driven by power from the spring, an oscillation circuit configured to output a clock signal, a speed governing mechanism including a permanent magnet and a coil, one of the permanent magnet and the coil being held by the balance, an external magnetic field detection mechanism configured to detect an external magnetic field by the coil, a vibration detection mechanism configured to detect vibration of the balance and output a vibration detection signal, a speed governing control mechanism configured to output a drive pulse in accordance with a result of comparison between the clock signal and the vibration detection signal, output a current to the coil by the drive pulse to generate an electromagnetic force, and cause the generated electromagnetic force to act on the permanent magnet to perform processing for governing the balance, a power storage mechanism configured to store electric energy to be supplied to the speed governing control mechanism, and a generator configured to generate the electric energy, wherein the speed governing control mechanism is configured to change a processing content of the speed governing of the balance in accordance with a result of the detection of the external magnetic field.

DESCRIPTION OF EMBODIMENTS

Hereinafter, a mechanical timepiece 1 according to an embodiment will be described with reference to the drawings.

Figure 1:
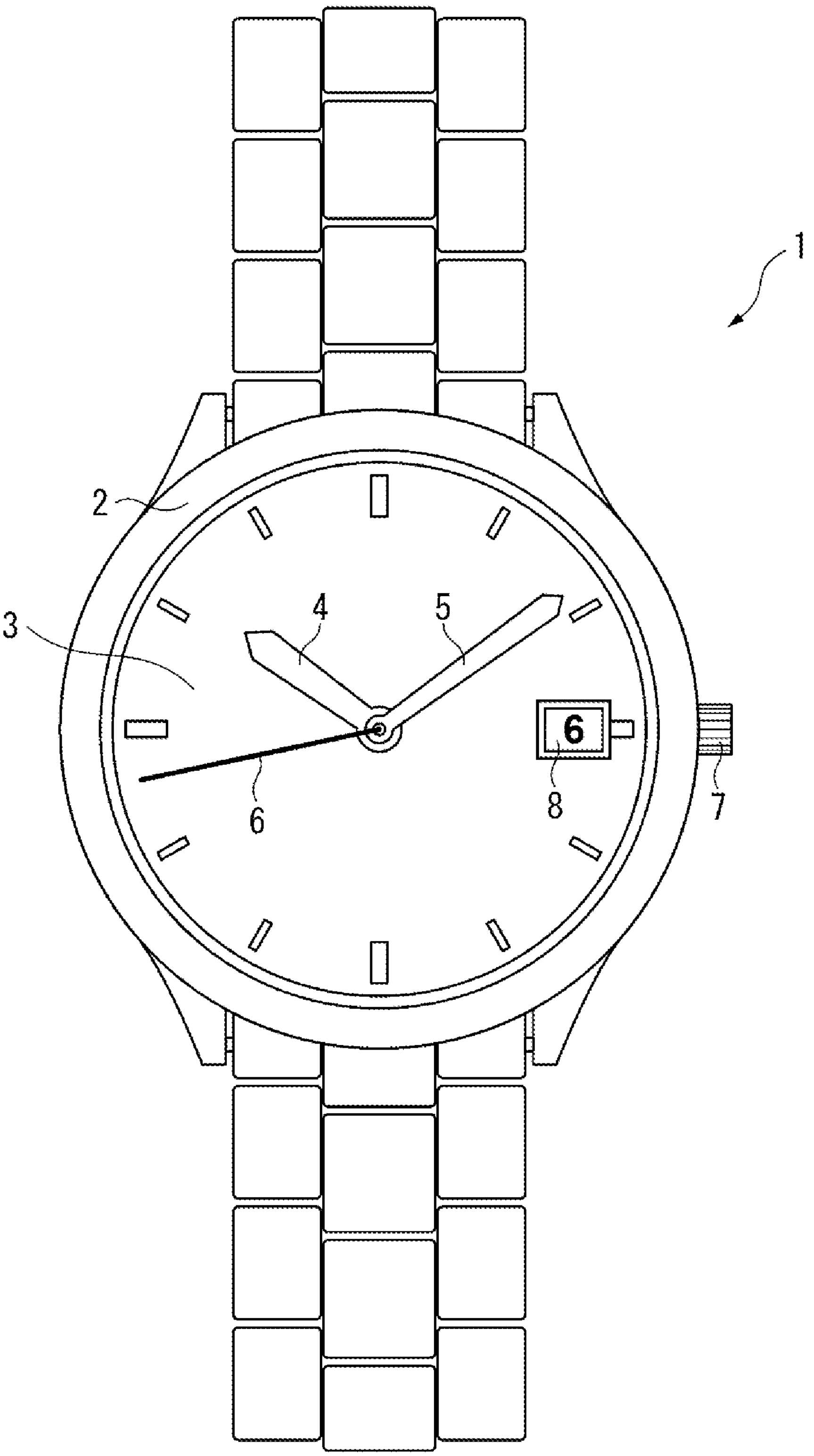
FIG. 1 is a front view illustrating a mechanical timepiece according to an embodiment.

As illustrated in FIG. 1, the mechanical timepiece 1 includes a case 2, a dial 3, an hour hand 4, a minute hand 5, a seconds hand 6, a crown 7, and a date indicator 8.

Figure 2:
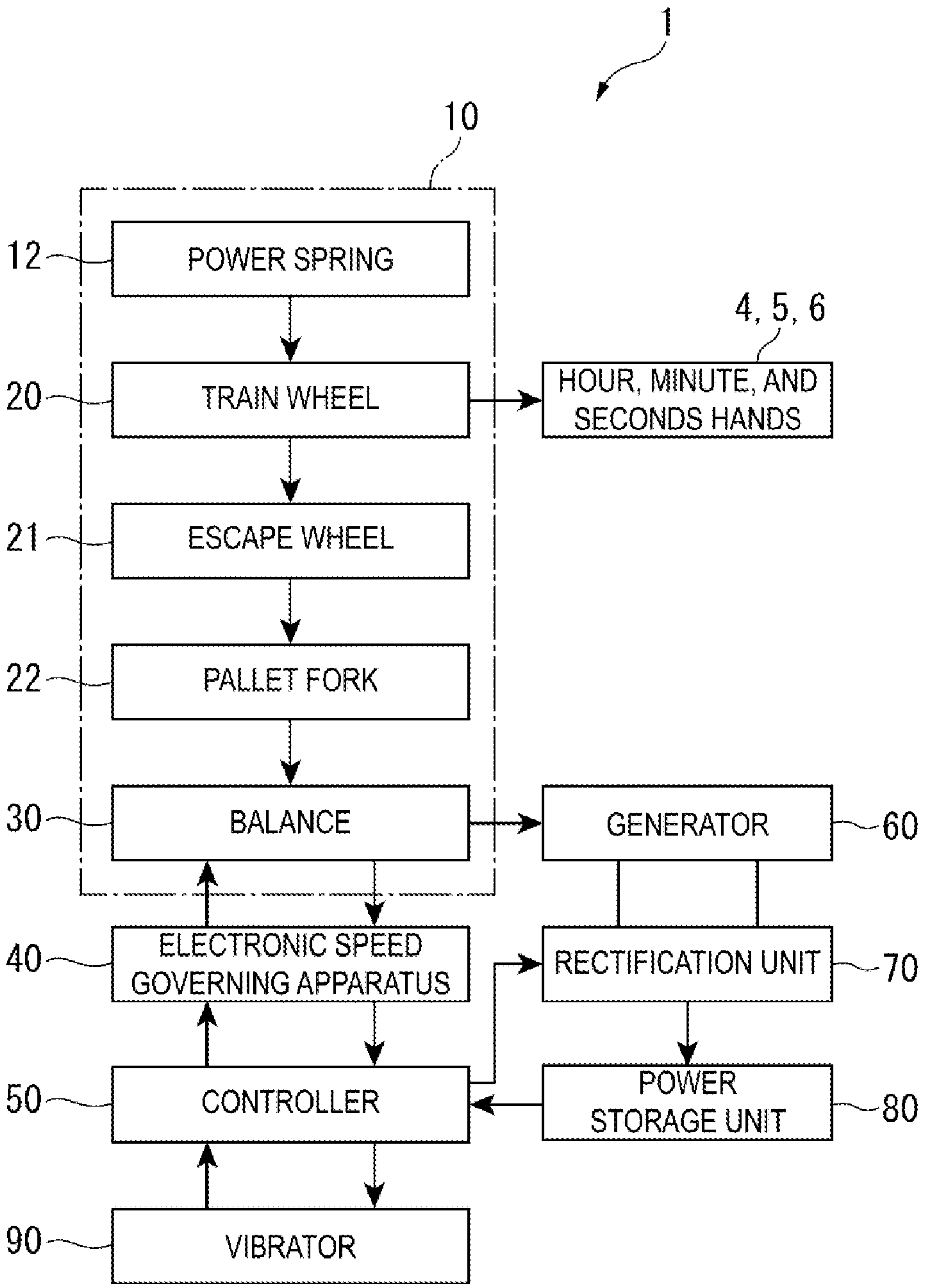
FIG. 2 is a block diagram illustrating a configuration of the mechanical timepiece.

As illustrated in FIG. 2, the mechanical timepiece 1 includes a mechanical movement 10, and an electronic speed governing apparatus 40, a controller 50, a generator 60, and a rectification unit 70, a power storage unit 80, and a vibrator 90 which are added to improve the accuracy of the mechanical movement 10.

As illustrated in FIG. 2, the mechanical movement 10 includes a power spring 12, a train wheel 20, an escape wheel 21, a pallet fork 22, and a balance 30, and the hour hand 4, the minute hand 5, and the seconds hand 6 are attached to the train wheel 20.

Figure 3:
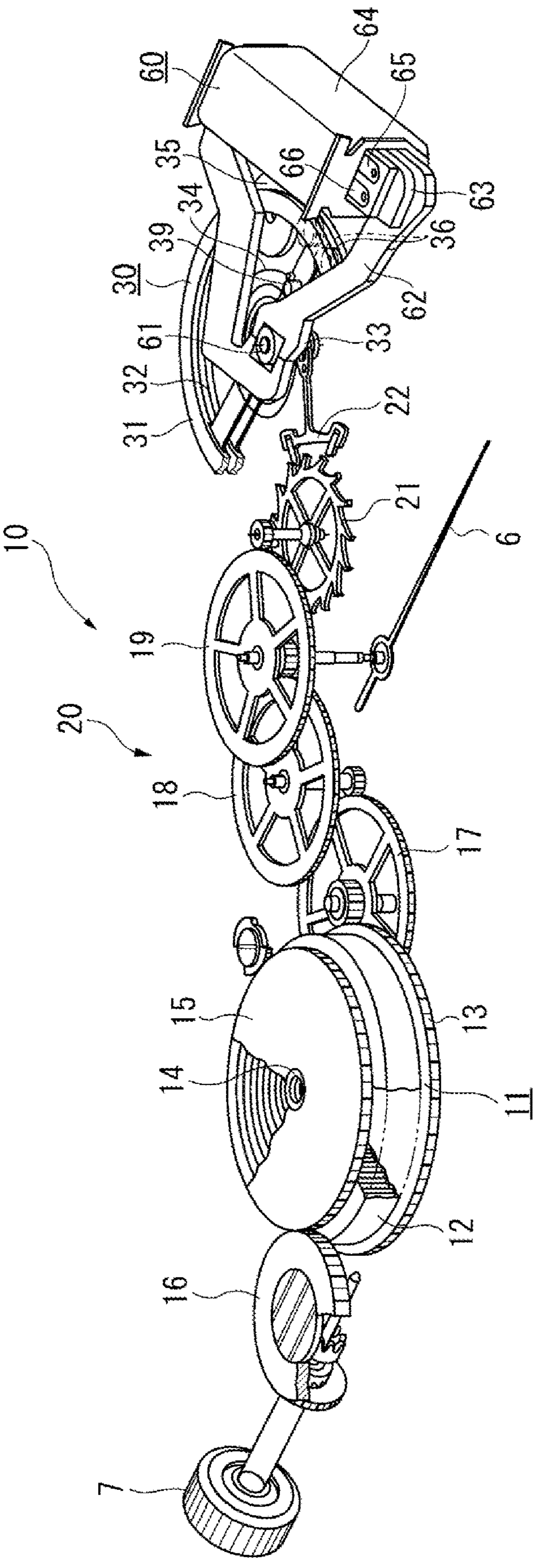
FIG. 3 is a schematic perspective view illustrating a configuration of main parts of the mechanical timepiece.

As also illustrated in FIG. 3, the power spring 12 is accommodated in a barrel wheel 11 constituted by a barrel gear 13, a barrel stem 14, and a barrel lid. In the spring 12, an outer end is fixed to the barrel gear 13, and an inner end is fixed to the barrel stem 14. The barrel stem 14 is inserted into a supporting member provided in a main plate and fixed by a square hole screw so as to rotate integrally with a ratchet wheel 15. The ratchet wheel 15 is rotated by the crown 7 through a crown wheel 16 and the like, and the spring 12 is wound up.

The rotation speed of the barrel gear 13 is increased by wheels, that is, a center wheel and pinion 17, a third wheel and pinion 18, and a fourth wheel and pinion 19. These gears 17 to 19 are pivotally supported by the main plate, the train wheel support, and the like. The gears 17 to 19 constitute the train wheel 20 that transmits mechanical energy from the spring 12. FIG. 3 illustrates only the seconds hand 6 fixed to a center seconds pinion that engages with the third wheel and pinion 18, but in practice the minute hand 5 and the hour hand 4 that are driven through a cannon pinion and an hour wheel, which are not illustrated in the drawing, are also provided.

The mechanical movement 10 includes an escapement including the escape wheel 21 and the pallet fork 22, and a speed governor including the balance 30. The escapement maintains the vibration of the speed governor by supplying the mechanical energy supplied from the spring 12 through the fourth wheel and pinion 19 to the speed governor little by little, and controls the rotational speed of the train wheel 20 in accordance with a vibration cycle of the speed governor.

Figure 4:
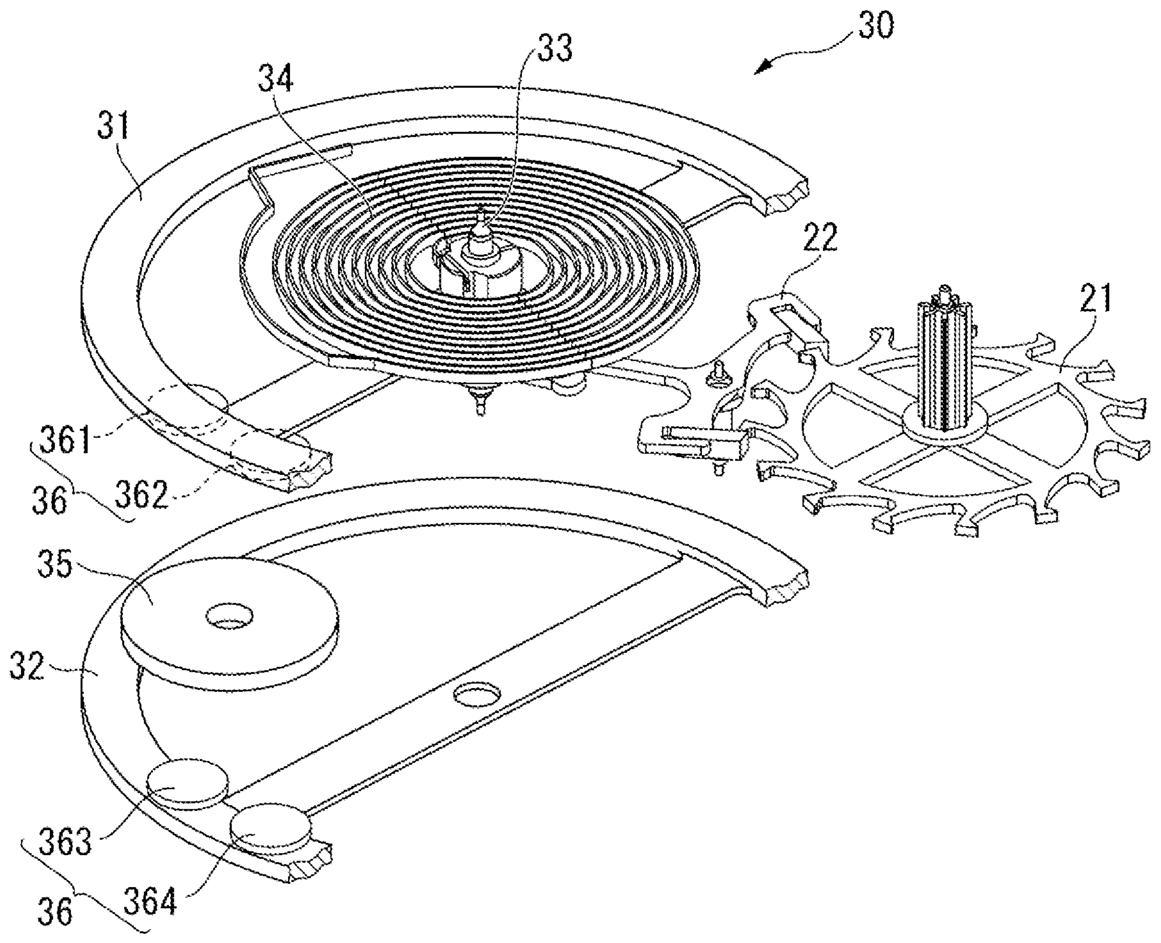
FIG. 4 is an exploded perspective view illustrating a balance, a pallet fork and an escape wheel of the mechanical timepiece.
Figure 5:
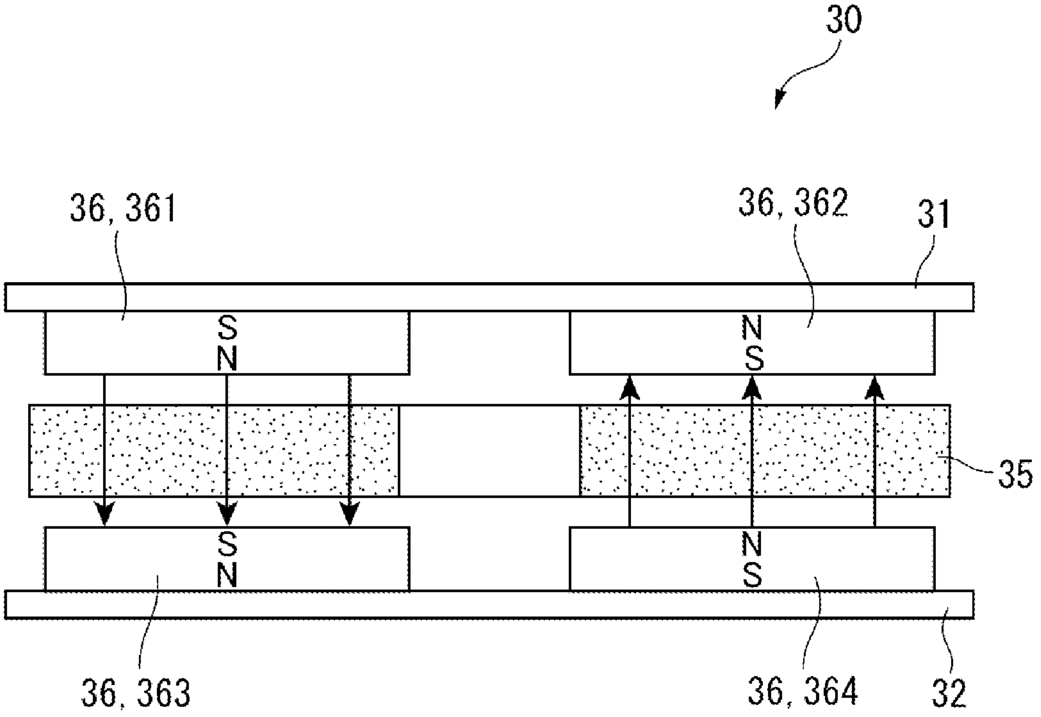
FIG. 5 is a side view illustrating a permanent magnet and a coil of the balance of the mechanical timepiece.
Figure 6:
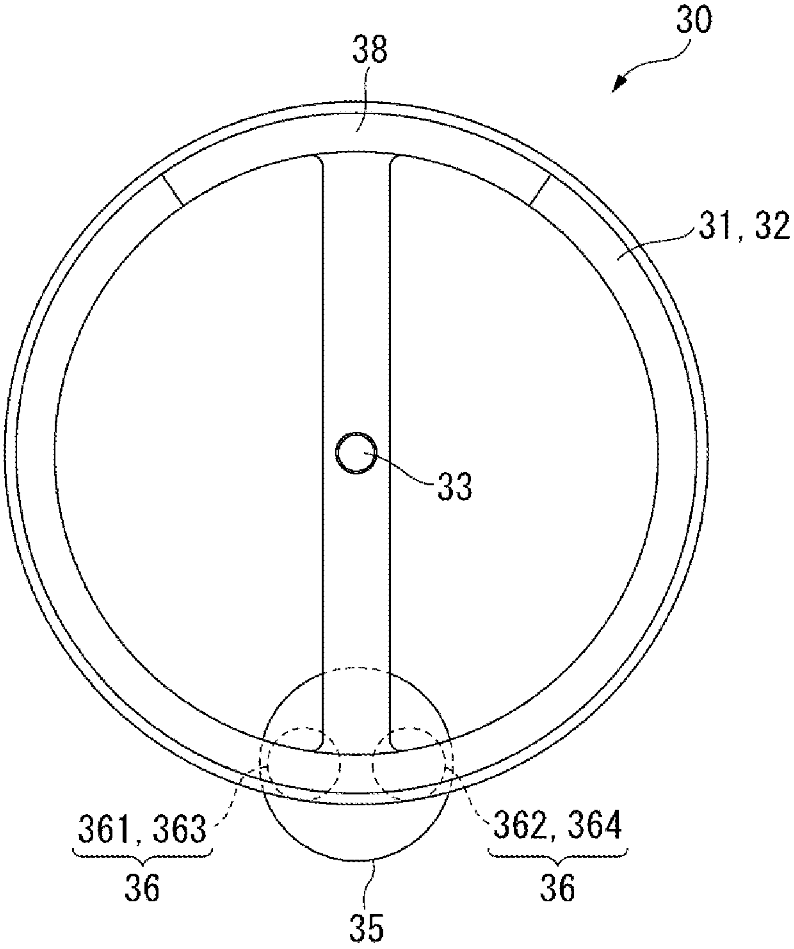
FIG. 6 is a plan view illustrating a balance wheel, the permanent magnet, and the coil of the mechanical timepiece.

As also illustrated in FIGS. 4 to 6, the balance 30 includes upper and lower balance wheels 31 and 32, a balance stem 33, and a balance spring 34. The balance 30 is provided with the thin balance spring 34 inside the balance wheels 31 and 32, and is configured such that one end of the balance spring 34 is fixed to the balance stem 33, which is the axis of the balance wheels 31 and 32, and an opposite end thereof is fixed to the timepiece body through a stud support 39. The balance wheels 31 and 32 of the balance 30 vibrate by repeating regular reciprocating rotational movement with expansion and contraction of the isochronous balance spring 34.

A permanent magnet 36 is attached to the opposing surfaces of the balance wheels 31 and 32 opposite to each other as also illustrated in FIG. 5. The permanent magnet 36 is constituted by a button-type neodymium magnet or the like, and includes permanent magnets 361 and 362 attached to the balance wheel 31 and permanent magnets 363 and 364 attached to the balance wheel 32.

A coil 35 is disposed between the upper and lower balance wheels 31 and 32. As described later, the coil 35 serves as a drive coil that governs the vibration speed of the balance 30 by applying a braking force and a driving force to the balance 30, a vibration detection coil that detects the vibration state of the balance 30, and an external magnetic field detection coil that detects an external magnetic field.

The permanent magnet 361 and the permanent magnet 363 are attached at positions opposite to each other in the axis direction of the balance stem 33 with the coil 35 interposed therebetween, and fixed to the balance wheels 31 and 32 such that the permanent magnet 361 is the N pole on the coil 35 side and the permanent magnet 363 is the S pole on the coil 35 side.

The permanent magnet 362 and the permanent magnet 364 are attached at positions opposite to each other in the axis direction of the balance stem 33 with the coil 35 interposed therebetween, and fixed to the balance wheels 31 and 32 such that the permanent magnet 362 is the S pole on the coil 35 side and the permanent magnet 364 is the N pole on the coil 35 side.

For this reason, as illustrated in FIG. 5, the line of magnetic force from the N pole to the S pole is in the direction from the permanent magnet 361 to the permanent magnet 363 and the direction from the permanent magnet 364 to the permanent magnet 362, and the coil 35 is provided to be orthogonal to these lines of magnetic force.

The balance wheels 31 and 32 integrally perform a right and left reciprocating rotational movement by the balance spring 34 with the balance stem 33 at the center, and the permanent magnet 36 is fixed to the balance wheels 31 and 32 and thus integrally performs a right and left reciprocating rotational movement. The coil 35 is fixed to a support plate of the mechanical movement 10 which is not illustrated in the drawing. In plan view as viewed in the axis direction of the balance stem 33 as illustrated in FIG. 6, the coil 35 is disposed at a position where it overlaps the permanent magnet 36 when the permanent magnet 36 performing a right and left reciprocating rotational movement passes through an intermediate position in the forward and backward paths.

The balance wheels 31 and 32 are unbalanced in weight due to the permanent magnets 361, 362, 363, and 364 attached thereto. For this reason, in the balance wheels 31 and 32, a weight balance adjustment weight 38 is attached on a side opposite to the permanent magnet 36 with respect to the balance stem 33.

FIGS. 7A to 7E are diagrams illustrating movements of the escape wheel 21, the pallet fork 22, and the balance 30.

When the escape wheel 21 rotates through the train wheel 20 with the mechanical energy accumulated in the spring 12, pallet stones 221 and 222 of the pallet fork 22 are pushed by a tooth 211 of the escape wheel 21, and a hoe 223 on a side opposite to the pallet stones 221 and 222 of the pallet fork 22 moves right and left to push a roller jewel 37 of the balance 30 and rotate the balance wheels 31 and 32. The roller jewel 37 is made of friction-resistant artificial ruby, and is characterized by acting to stay at the center of the ho 223, but it moves right and left when the hoe 223 moves right and left due to the pallet stones 221 and 222 of the pallet fork 22 pushed by the tooth 211 of the escape wheel 21, which rotates the balance wheels 31 and 32 right and left, and rotates the balance wheels 31 and 32 in the opposite direction from the state completely turned right and left by the balance spring 34.

Figure 7A:
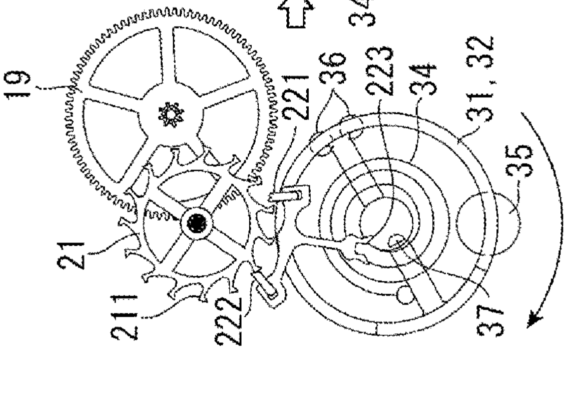
FIGS. 7A to 7E are diagrams illustrating operations of the balance of the mechanical timepiece.
Figure 7B:
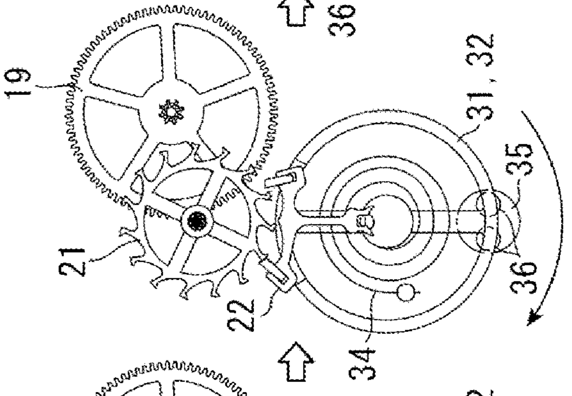
Figure 7C:
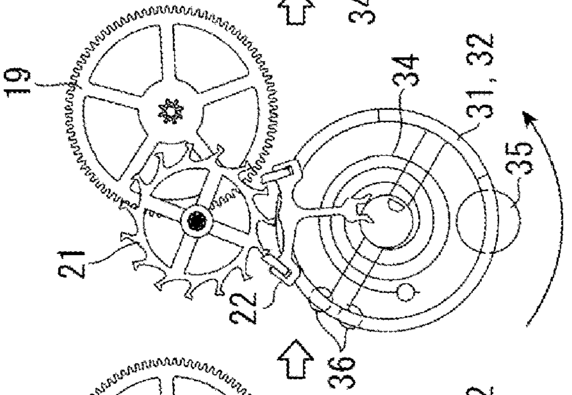
Figure 7D:
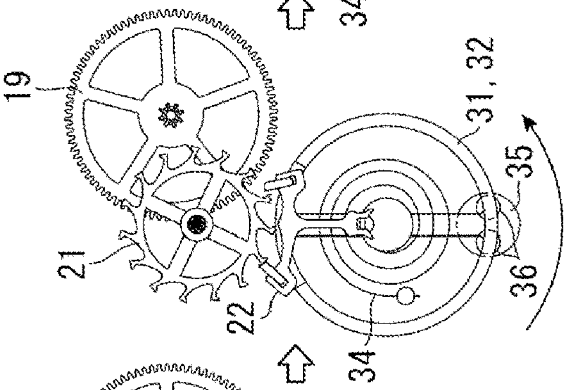
Figure 7E:
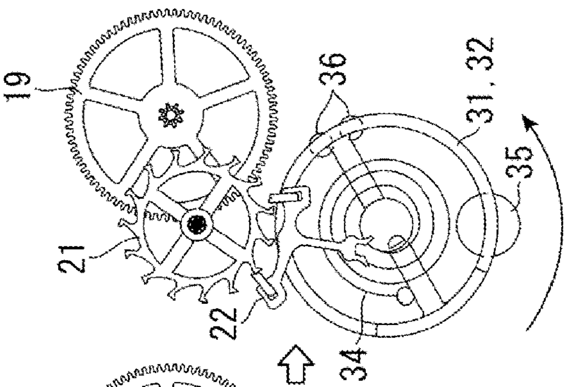

Here, when the rotation angle of the balance wheels 31 and 32 is 270 degrees, FIG. 7A illustrates a state in which the balance wheels 31 and 32 have rotated right (counterclockwise) and then start to rotate left (clockwise) due to the balance spring 34. FIG. 7B illustrates a state in which the balance wheels 31 and 32 have rotated left by 135 degrees, that is, they are at the intermediate position in the left rotation. FIG. 7C illustrates a state in which the balance wheels 31 and 32 have rotated left, that is, they start to rotate right due to the balance spring 34. In addition, FIG. 7D illustrates a state in which the balance wheels 31 and 32 have rotated right by 135 degrees, that is, they are at the intermediate position in the right rotation, and FIG. 7E illustrates a state in which the balance wheels 31 and 32 have rotated right. For this reason, the state returns to the state illustrated in FIG. 7A to repeat the operations illustrated in FIGS. 7A to 7E.

In this embodiment, the coil 35 is disposed at the intermediate position in the right and left rotations of the balance wheels 31 and 32, and the permanent magnet 36 is disposed at a position that overlaps the coil 35 in plan view at the intermediate position.

Figure 8:
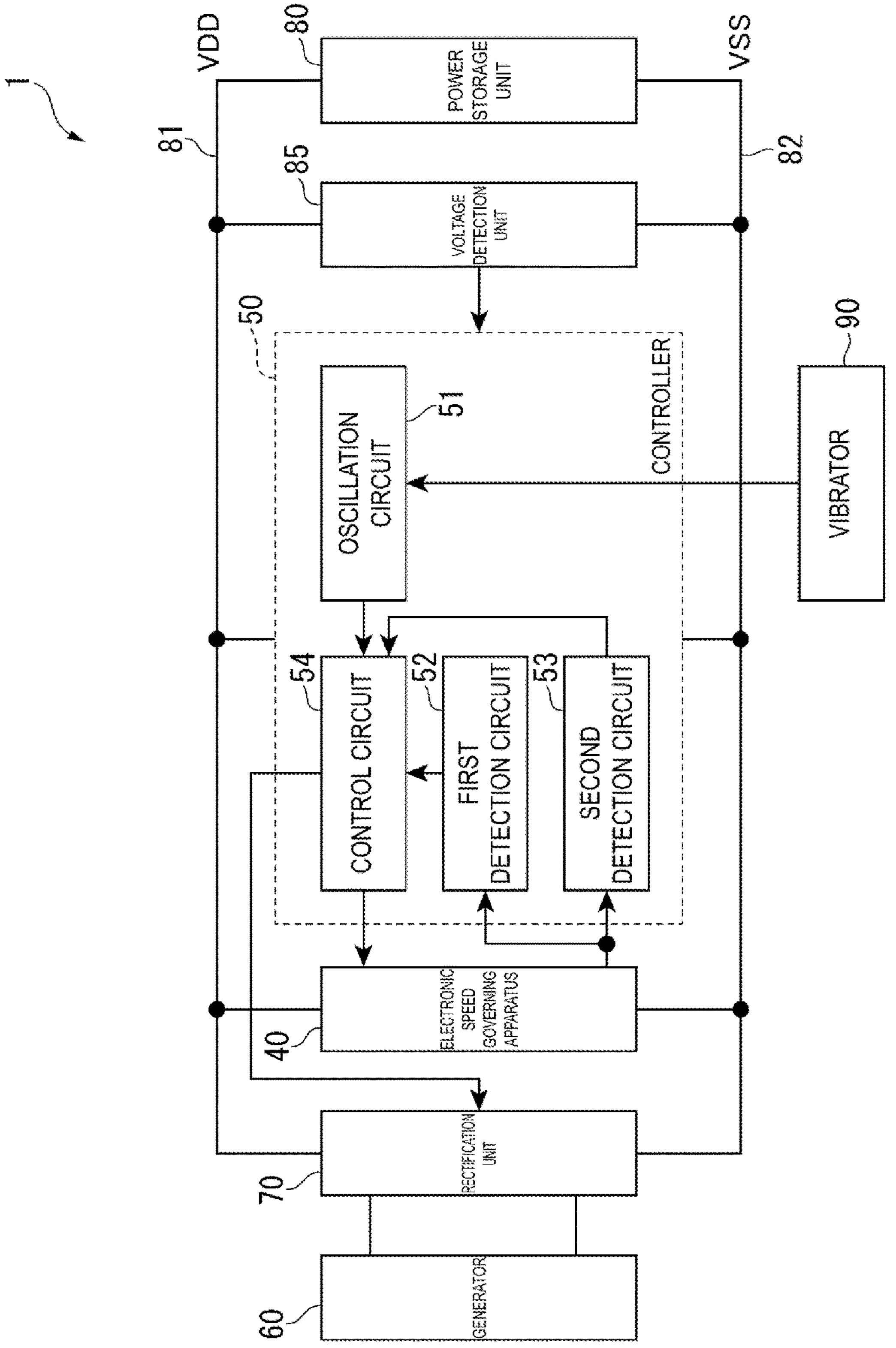
FIG. 8 is a block diagram illustrating a circuit configuration of the mechanical timepiece.

FIG. 8 is a circuit block diagram of the mechanical timepiece 1. As illustrated in FIG. 8, the mechanical timepiece 1 includes the controller 50, the generator 60, the rectification unit 70, the electronic speed governing apparatus 40, the power storage unit 80, a voltage detection unit 85, and the vibrator 90.

The controller 50 includes an oscillation circuit 51, a first detection circuit 52, a second detection circuit 53, and a control circuit 54.

The electronic speed governing apparatus 40, the controller 50, the rectification unit 70, the power storage unit 80, and the voltage detection unit 85 are coupled to a first power supply line 81 and a second power supply line 82. In this embodiment, the potential of the first power supply line 81 is VDD, and the potential of the second power supply line 82 is VSS which is a potential different from VDD. In this embodiment, the potential VDD on a high potential side is used as a reference potential, but the potential VSS on a low potential side may be used as a reference potential.

As illustrated in FIG. 3, the generator 60 includes a power generation rotor 61 attached to the balance stem 33, a stator 62 defining an opening in which the power generation rotor 61 is disposed, a magnetic core 63 having both ends fixed to the stator 62, a power generation coil 64 wound around the magnetic core 63, and terminals 65 and 66 to which both ends of the power generation coil 64 are electrically coupled.

The generator 60 is an electromagnetic generator in which the power generation rotor 61 rotates together with the balance stem 33 by mechanical energy transmitted from the spring 12 to the balance 30 via the train wheel 20 to thereby change the direction of the lines of magnetic force flowing through the stator 62 and the magnetic core 63 and generate induced power in the power generation coil 64.

Figure 9:
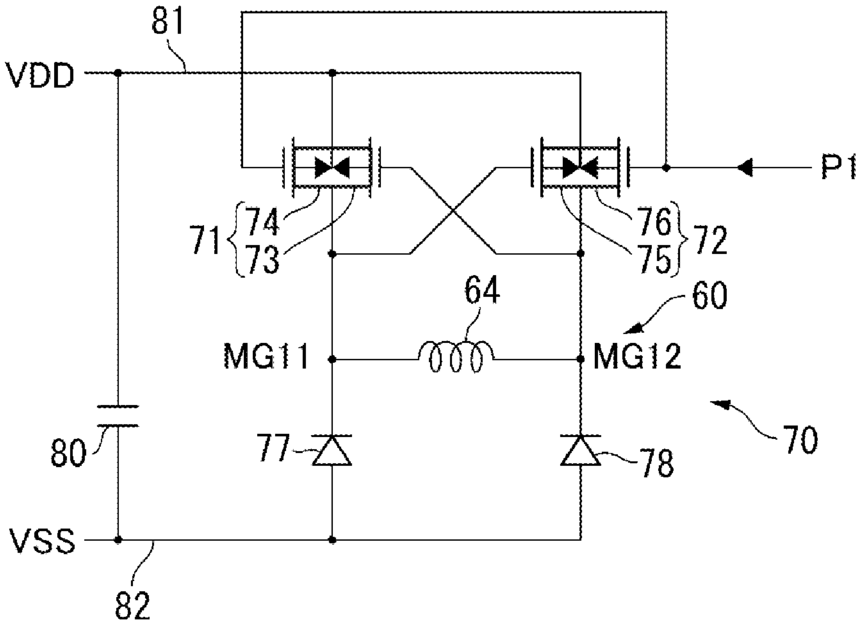
FIG. 9 is a circuit diagram illustrating a configuration of a rectification unit of the mechanical timepiece.

As illustrated in FIG. 9, the rectification unit 70 is a full-wave rectification circuit, and short-circuits the power generation coil 64 of the generator 60 by chopping to step up and rectify AC power generated in the power generation coil 64 and charge the power storage unit 80 with the AC power. For this reason, the rectification unit 70 includes a first switch 71, a second switch 72, and diodes 77 and 78.

The first switch 71 includes P-channel field effect transistors 73 and 74 coupled between a first terminal MG11 of the power generation coil 64 and the first power supply line 81. The field effect transistors 73 and 74 are coupled in parallel to each other, a gate of the field effect transistor 73 is coupled to a second terminal MG12 of the power generation coil 64, and a gate of the field effect transistor 74 is coupled to the control circuit 54.

The second switch 72 includes P-channel field effect transistors 75 and 76 coupled between the second terminal MG12 and the first power supply line 81. The field effect transistors 75 and 76 are coupled in parallel to each other, a gate of the field effect transistor 75 is coupled to a first terminal MG11, and a gate of the field effect transistor 76 is coupled to the control circuit 54.

The first and second terminals MG11 and MG12 of the power generation coil 64 are coupled to the rectification unit 70 via the terminals 65 and 66 provided in the generator 60.

The gates of the field effect transistor 73 of the first switch 71 and the field effect transistor 75 of the second switch 72 are coupled to the second terminal MG12 and the first terminal MG11, respectively. Thus, when the generator 60 is generating power, a transistor coupled to a terminal on a low potential side of the power generation coil 64 out of the field effect transistors 73 and 75 is set to be in an off state, and a transistor coupled to a terminal on a high potential side is set to be in an on state.

When a chopper signal P1 output from the control circuit 54 is input to the gates of the field effect transistor 74 of the first switch 71 and the field effect transistor 76 of the second switch 72, chopping control is executed, and the field effect transistor 74 and the field effect transistor 76 are simultaneously controlled to be in an on state or an off state.

The diodes 77 and 78 are disposed between the first and second terminals MG11 and MG12 of the power generation coil 64 and the second power supply line 82. Each of the diodes 77 and 78 may be a unidirectional element that allows a current to flow in one direction, and can be of any type, for example, a Schottky barrier diode or a silicon diode.

The chopping control of the generator 60 is control of outputting the chopper signal P1 from the control circuit 54 to the rectification unit 70 and simultaneously turning on or turning off the field effect transistors 74 and 76 for chopping at a higher frequency than in the case of the rotation of the power generation rotor 61. By this control, short-circuiting and opening of both ends of the power generation coil 64 are repeated. During a period in which the field effect transistors 74 and 76 are simultaneously turned on, both ends of the power generation coil 64 are in a short-circuited state, and thus a large current flows through the power generation coil 64. Next, when the two field effect transistors 74 and 76 described above are simultaneously turned off, a current flowing through the power generation coil 64 at that moment is converted into a voltage, and a high induced voltage is generated.

The rectification unit 70 is not limited to the full-wave rectification circuit illustrated in FIG. 9. That is, it is only required that the rectification unit 70 includes step-up rectification, full-wave rectification, half-wave rectification, transistor rectification, and the like, and can rectify an AC output of the generator 60 and charge the power storage unit 80. The AC output of the generator 60 may be rectified to charge the power storage unit 80 without performing step-up rectification by chopping.

The power storage unit 80 is constituted by a secondary battery, a capacitor, and the like. The power storage unit 80 is coupled to the rectification unit 70, the electronic speed governing apparatus 40, the voltage detection unit 85, and the controller 50 via the first power supply line 81 and the second power supply line 82. For this reason, electric energy generated by the generator 60 is stored in the power storage unit 80 via the rectification unit 70. The electric energy stored in the power storage unit 80 is supplied to the controller 50 and the electronic speed governing apparatus 40. With the power storage unit 80 provided, the controller 50 can be operated with electric energy stored in the power storage unit 80 even while the power generation of the generator 60 is stopped, and thus the speed governing control of the balance 30 by the electronic speed governing apparatus 40 can be continued. Thus, the power storage unit 80 is a power storage mechanism that stores electric energy to be supplied to the control circuit 54 serving as a speed governing control mechanism to be described later.

An all-solid battery is preferably used for the power storage unit 80. All-solid battery has low battery capacity, but is characterized by almost no degradation in performance over time, and is thus suitable as the power storage unit 80 of the mechanical timepiece 1 that can be continuously used for a long period of time. The mechanical timepiece 1 drives hands such as the hour hand 4, the minute hand 5 and the seconds hand 6 with the spring 12, and the generator 60 and the power storage unit 80 need only to generate and store a small amount of power required for driving an IC constituting the controller 50. For example, the power consumption of the mechanical timepiece 1 that performs electronic speed governing in this embodiment is approximately 1/20 of the power consumption of an analog quartz watch that operates hands by a step motor. Thus, a small-sized generator with small generated power can be used as the generator 60. The power storage unit 80 can use a secondary battery with low battery capacity, for example, an all-solid battery.

The voltage detection unit 85 detects the voltage of the power storage unit 80 and outputs a detection result to the controller 50. Thus, the voltage detection unit 85 detects the amount of energy stored in the power storage unit 80.

The vibrator 90 is a crystal oscillator or a silicon MEMS oscillator. MEMS is an abbreviation for Micro Electro Mechanical Systems, and when a MEMS vibrator is used, it is less precise than a crystal oscillator, but the size thereof can be reduced. The vibrator 90 outputs a clock signal of a predetermined frequency to the controller 50.

Figure 10:
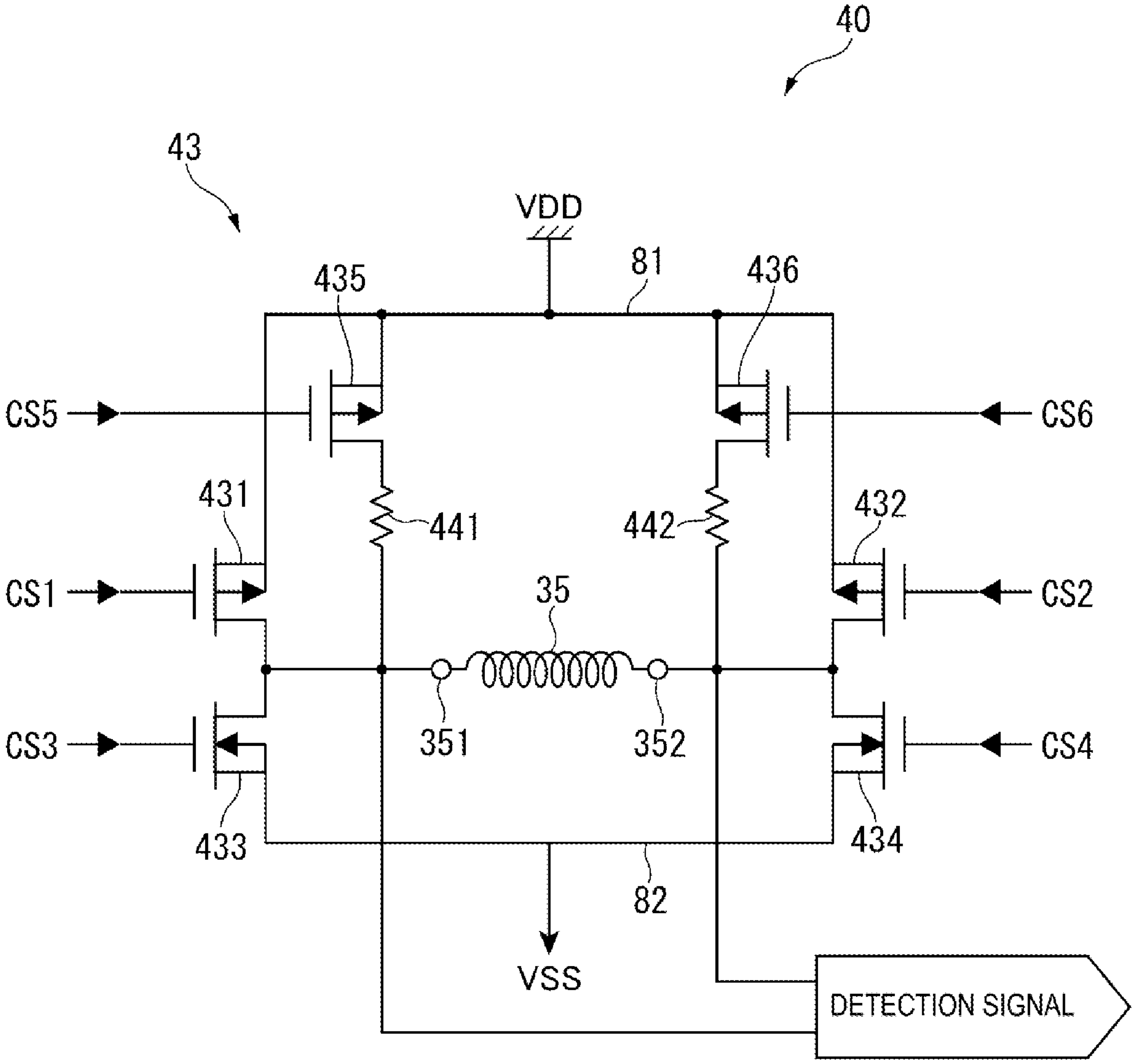
FIG. 10 is a circuit diagram illustrating a configuration of an electronic speed governing apparatus of the mechanical timepiece.

The electronic speed governing apparatus 40 is a speed governing mechanism that governs the speed of reciprocating rotational movement of the balance 30, and includes the permanent magnet 36 held in the balance 30, the coil 35, and a switch circuit 43 illustrated in FIG. 10.

The switch circuit 43 is controlled by the control circuit 54 and includes the coil 35, a first switch 431, a second switch 432, a third switch 433, a fourth switch 434, a fifth switch 435, a sixth switch 436, a first resistance element 441, and a second resistance element 442. An on state and an off state of the switches 431 to 436 are controlled by control signals CS1 to CS6 output from the control circuit 54.

The first switch 431 is a P-channel field effect transistor coupled between a first terminal 351 of the coil 35 and the first power supply line 81. The second switch 432 is a P-channel field effect transistor coupled between a second terminal 352 of the coil 35 and the first power supply line 81.

The third switch 433 is an N-channel field effect transistor coupled between the first terminal 351 of the coil 35 and the second power supply line 82. The fourth switch 434 is an N-channel field effect transistor coupled between the second terminal 352 of the coil 35 and the second power supply line 82.

The fifth switch 435 is a P-channel field effect transistor coupled between the first terminal 351 of the coil 35 and the first power supply line 81. The sixth switch 436 is a P-channel field effect transistor coupled between the second terminal 352 of the coil 35 and the first power supply line 81.

The first resistance element 441 is coupled between the first terminal 351 of the coil 35 and the fifth switch 435, and the second resistance element 442 is coupled between the second terminal 352 of the coil 35 and the sixth switch 436. The first resistance element 441 and the second resistance element 442 are constituted by a semiconductor-diffused resistor with a built-in IC, or the like of approximately 100 kΩ.

The fifth switch 435 and the first resistance element 441 are coupled in series between the first terminal 351 of the coil 35 and the first power supply line 81, and are coupled in parallel with the first switch 431.

The sixth switch 436 and the second resistance element 442 are coupled in series between the second terminal 352 of the coil 35 and the first power supply line 81, and are coupled in parallel with the second switch 432.

The oscillation circuit 51 oscillates the vibrator 90, divides an oscillation signal and outputs a reference clock of a predetermined frequency to the control circuit 54. The frequency of the reference clock is set in accordance with a vibration detection cycle of the balance 30. For example, when the balance 30 is set to six vibrations per second, and a vibration detection cycle of the balance 30 is every second, that is, 1 Hz, the frequency of a reference clock may be set to 1 Hz, and when the vibration of the balance 30 is detected for each vibration, that is, when a vibration detection cycle is 6 Hz, the frequency of a reference clock may be set to 6 Hz.

Also as illustrated in FIG. 10, the first detection circuit 52 and the second detection circuit 53 are coupled to the first terminal 351 and the second terminal 352 of the coil 35, respectively, and are configured to be able to detect an induced voltage waveform generated in the coil 35 by comparing the induced voltage waveform with a preset threshold value. In this embodiment, a first threshold value used in the first detection circuit 52 for detecting the vibration of the balance 30 is set to a value larger than a second threshold value used in the second detection circuit 53 for detecting an external magnetic field. As the second detection circuit 53, a circuit having a high response speed is used to be able to also detect a signal having a short pulse width.

As described above, the control circuit 54 outputs the chopper signal P1 to the rectification unit 70 and outputs the control signals CS1 to CS6 to the switch circuit 43.

For this reason, the controller 50 executes external magnetic field detection processing, vibration detection processing of the balance 30, and speed governing control of the balance 30 in addition to the chopping control of the generator 60 described above.

The external magnetic field detection processing of the controller 50, the vibration detection processing of the balance 30, and the speed governing control of the balance 30 will be described with reference to FIGS. 11 to 16.

The mechanical timepiece 1 starts to be started up when the spring 12 is wound up by the crown 7. That is, when the escape wheel 21 is rotated through the train wheel 20 by the mechanical energy accumulated in the spring 12, the pallet fork 22 swings right and left, and the balance wheels 31 and 32 of the balance 30 vibrate in the right-left direction. The balance stem 33 and the power generation rotor 61 rotate by the vibration of the balance wheels 31 and 32, a system such as the controller 50 is started up by an increase in the voltage of the power storage unit 80 due to the generation of an electromotive force in the power generation coil 64 and the generated electric energy being accumulated in the power storage unit 80, and the vibrator 90 is operated by the oscillation circuit 51.

Figure 11:
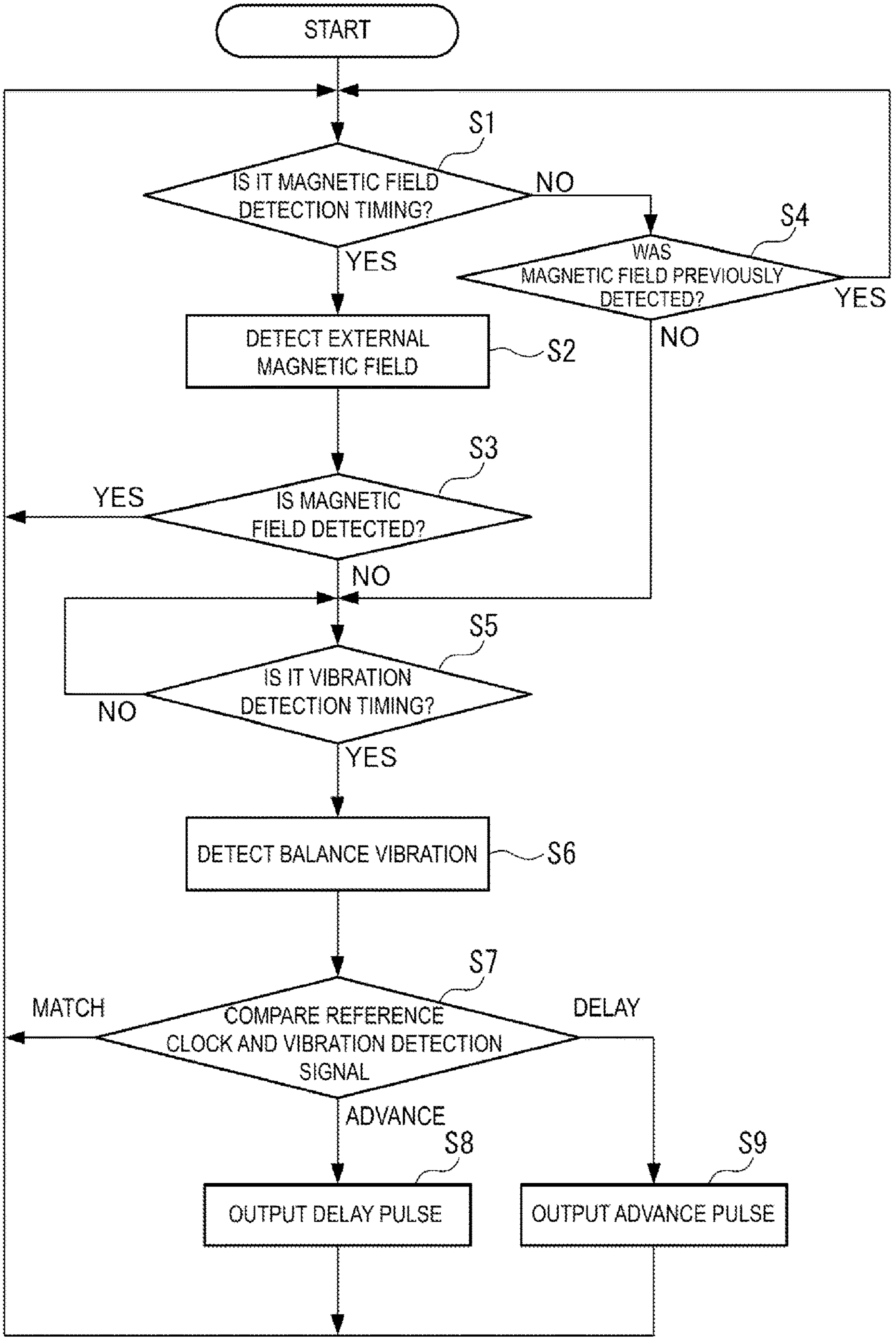
FIG. 11 is a flowchart illustrating the control of the mechanical timepiece.

After the controller 50 is started up, the controller 50 detects the voltage of the power storage unit 80 by the voltage detection unit 85 at intervals of one minute, and the controller 50 executes control illustrated in a flowchart of FIG. 11 while the voltage of the power storage unit 80 is maintained at a predetermined voltage value or more.

External Magnetic Field Detection Processing

First, the controller 50 executes step S1 of determining whether it is a magnetic field detection timing. The magnetic field detection timing is set to be a fixed time interval, for example, an interval of 10 seconds, and is set to be a timing at which the permanent magnet 36 attached to the balance wheels 31 and 32 does not pass over the coil 35.

When the magnetic field detection timing is set and the controller 50 determines YES in step S1, the controller 50 executes step S2 of detecting an external magnetic field. In step S2, as illustrated in an external magnetic field detection period T1 of a timing chart of FIG. 12, the control circuit 54 outputs the control signals CS1 to CS6 for turning on the second switch 432 and the fifth switch 435 and turning off the other switches 431, 433, 434, and 436. The external magnetic field detection period T1 is, for example, approximately 30 msec.

Specifically, since the second switch 432 and the fifth switch 435 are P-channel field effect transistors, the control circuit 54 switches the control signals CS2 and CS5 to an L level to turn on the switches 432 and 435. Since the first switch 431 and the sixth switch 436 are P-channel field effect transistors, the control circuit 54 maintains the control signals CS1 and CS6 at an H level and maintains the switches 431 and 436 in an off state. Since the third switch 433 and the fourth switch 434 are N-channel field effect transistors, the control circuit 54 maintains the control signals CS3 and CS4 at an L level and maintains the switches 433 and 434 in an off state.

After the external magnetic field detection period T1 elapses, the control circuit 54 outputs the control signals CS1 to CS6 for turning off the switches 431 to 436.

Figure 13:
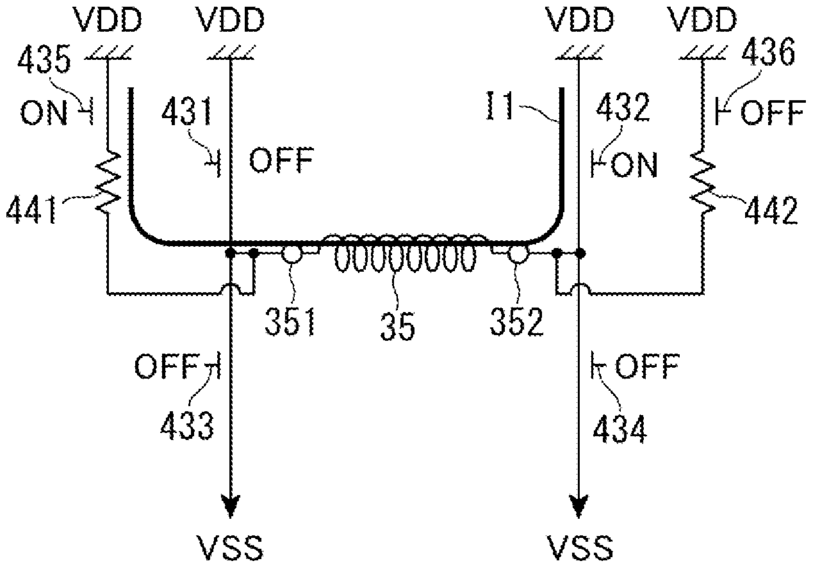
FIG. 13 is a circuit diagram illustrating operations at the time of vibration detection and at the time of external magnetic field detection in the electronic speed governing apparatus of the mechanical timepiece.

When affected by an external magnetic field in the external magnetic field detection period T1, a current I1 flows through the coil 35 as illustrated in FIG. 13. Since the current I1 flows through the first resistance element 441 for detection, a larger voltage waveform appears at the first terminal 351 as compared with a case in which no detection resistor is provided. Thus, when the second detection circuit 53 coupled to the first and second terminals 351 and 352 detects a voltage waveform exceeding a second threshold value in the external magnetic field detection period T1, the controller 50 determines YES because an external magnetic field is detected in step S3. On the other hand, when a voltage waveform exceeding the second threshold value is not detected, the controller 50 determines NO in step S3.

Figure 14:
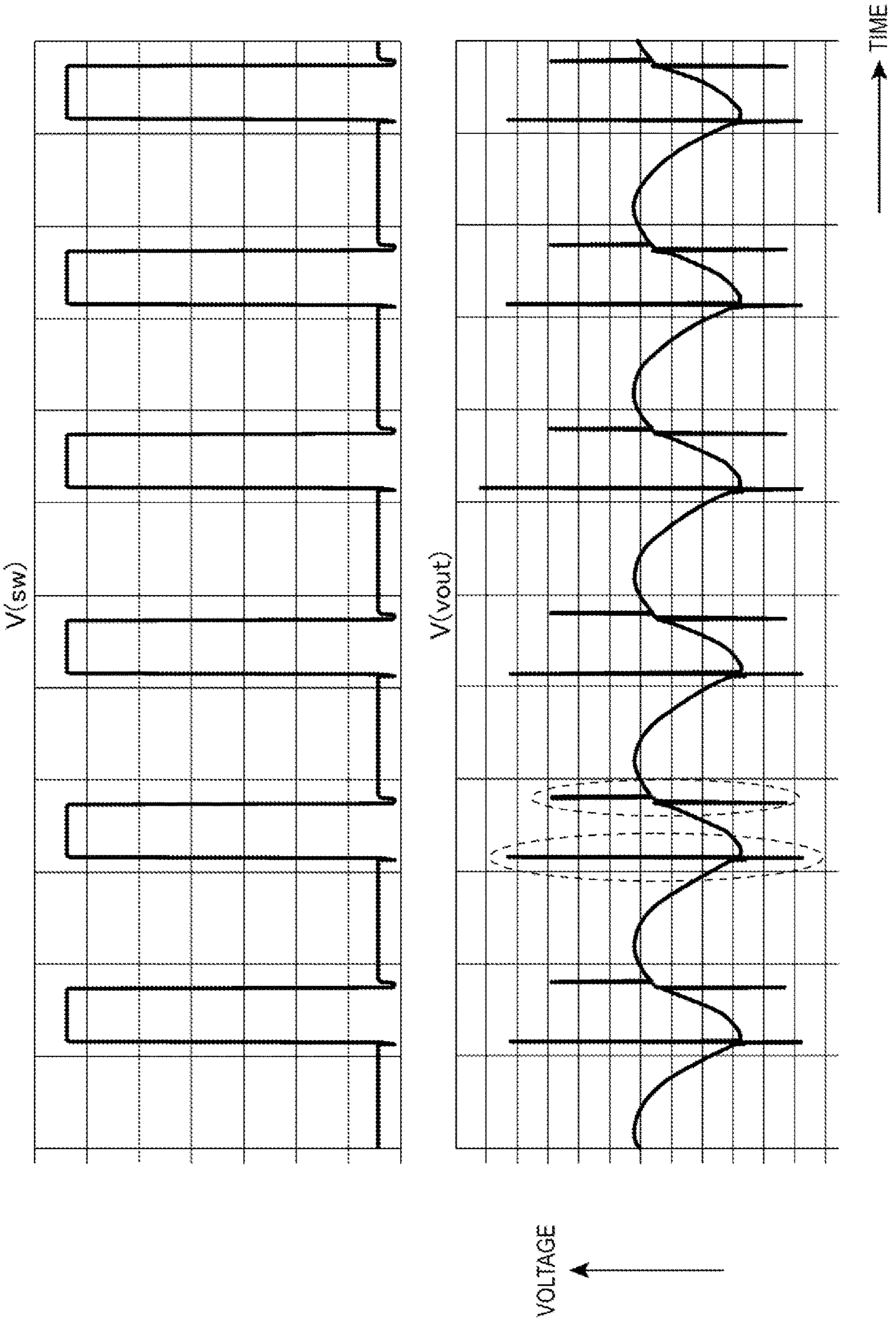
FIG. 14 is a diagram illustrating a switching waveform and an output waveform of a switching regulator as an example of a generation factor of external noise.
Figure 15A:
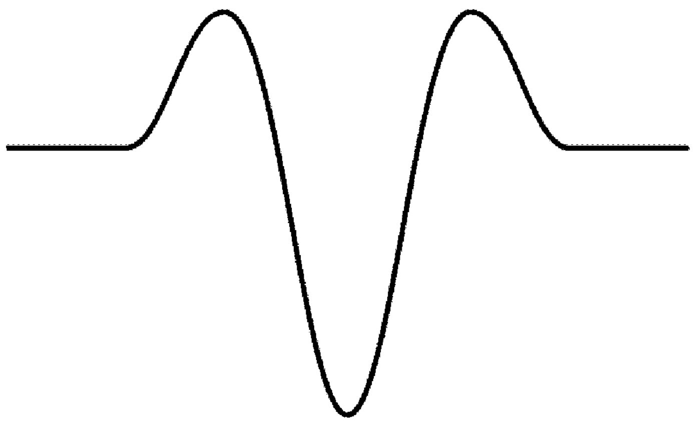
FIGS. 15A and 15B are waveform diagrams illustrating vibration detection waveforms of the mechanical timepiece.
Figure 15B:
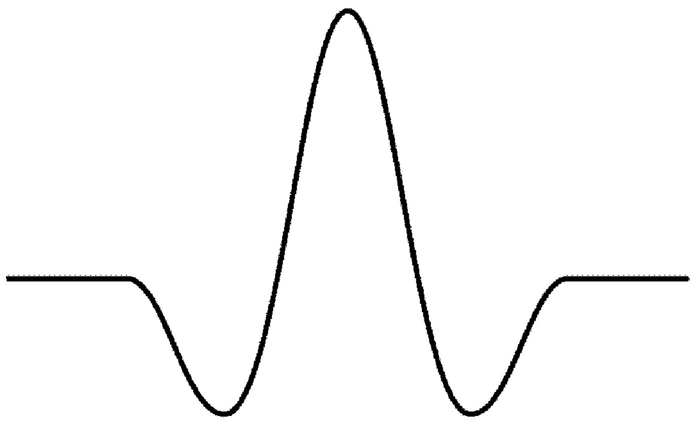

The external magnetic field detected in the external magnetic field detection period T1 is, for example, spike noise caused by a switching regulator. A switching regulator has advantages of high efficiency and a small size as a DC/DC converter, and thus is widely used as a power supply device for electronic equipment or the like. However, as illustrated in FIG. 14, there is a disadvantage in that a large spike noise is generated when the voltage of a switching waveform illustrated at an upper stage changes, as indicated by a portion surrounded by a dotted line illustrated at a lower stage. For this reason, when electronic equipment is present near the mechanical timepiece 1 and spike noise caused by the switching regulator plunges into the coil 35 during a vibration detection operation of the balance 30 using the coil 35, there is a possibility that the vibration of the balance 30 will be erroneously detected.

When the controller 50 detects a magnetic field and determines YES in step S3, the controller 50 returns to step S1. When the controller 50 determines NO in step S1, that is, during the magnetic field detection timing generated at intervals of 10 seconds, that is, until a magnetic field detection timing after 10 seconds is set, the controller 50 executes step S4 of determining whether a magnetic field was detected in the previous external magnetic field detection.

When the controller 50 detects an external magnetic field at the previous magnetic field detection timing and determines YES in step S4, the controller 50 returns to step S1. For this reason, when the controller 50 detects an external magnetic field, the controller 50 does not execute vibration detection processing and speed governing control for 10 seconds until the next magnetic field detection timing, that is, until a first period elapses. This is because there is a possibility that it is not possible to detect the vibration of the balance 30, specifically, an accurate timing at which permanent magnet 36 provided in the balance wheels 31 and 32 of the balance 30 passes the coil 35 under the influence of the external magnetic field.

When the switches 432 and 435 are turned on in the external magnetic field detection period T1, the controller 50 turns on the switches 431 and 436 in the next external magnetic field detection period and alternately switches the switches to be turned on in the external magnetic field detection period. Since the direction of a magnetic field that is easy to detect changes between when the switches 432 and 435 are turned on and when the switches 431 and 436 are turned on, there is an advantage in that a magnetic field can be easily detected by alternately turning on the switches.

Vibration Detection Processing

When the controller 50 determines NO in step S3 and determines NO in step S4, that is, when it can be estimated that there is no influence of an external magnetic field, the controller 50 executes step S5 of determining whether it is a vibration detection timing. The vibration detection timing is set to be a fixed time interval, for example, an interval of one second, and is set to be a timing at which the permanent magnet 36 attached to the balance wheels 31 and 32 passes over the coil 35.

When the vibration detection timing is set and the controller 50 determines YES in step S5, the controller 50 executes step S6 of detecting the vibration of the balance 30. In step S6, as illustrated in a vibration detection period T2 of the timing chart of FIG. 12, the control circuit 54 outputs the control signals CS1 to CS6 for turning on the second switch 432 and the fifth switch 435 and turning off the other switches 431, 433, 434, and 436. For this reason, as in the external magnetic field detection period T1, as illustrated in FIG. 13, the second switch 432 and the fifth switch 435 are turned on, the other switches 431, 433, 434, and 436 are turned off, the coil 35 for detection is coupled to a reference potential VDD, and a vibration detection state in which vibration of the balance 30 can be detected is set. It is only required that the vibration detection period T2 is set in consideration of variations in the vibration of the balance 30, and is, for example, approximately 100 to 200 msec.

After the vibration detection period T2 elapses, the control circuit 54 outputs the control signals CS1 to CS6 for turning off the switches 431 to 436.

When the balance wheels 31 and 32 rotate and the permanent magnet 36 approaches the coil 35 in the vibration detection period T2, a current I1 flows through the coil 35 and the first resistance element 441, and an induced voltage waveform is generated in the coil 35 as when an external magnetic field is detected. The induced voltage waveform generated in the coil 35 is opposite between a waveform of a forward path of the balance 30 illustrated in FIG. 15A and a waveform of a backward path of the balance 30 illustrated in FIG. 15B, and a timing at which a peak value thereof is generated is a fixed timing at which the permanent magnet 36 passes over the coil 35. For this reason, the first detection circuit 52 can detect a rotation to a vibration detection position set by a rotational direction of the balance wheels 31 and 32 and a vibration phase, that is, a positional relationship between the permanent magnet 36 and the coil 35 held by the balance wheels 31 and 32.

When a half cycle of the balance 30 is set to be one vibration and six vibrations are set for one second, an induced voltage waveform is generated in the coil 35 a total of six times, that is, three times per second in a forward path and three times in a backward path. Since the vibration detection timing is set to be an interval of one second, one waveform among a total of six induced voltage waveforms is detected in the vibration detection period T2.

Next, the controller 50 executes step S7, compares a reference clock input from the oscillation circuit 51 in the control circuit 54 with a vibration detection signal input from the first detection circuit 52, and determines whether the vibration of the balance wheels 31 and 32 is advanced or delayed with respect to the reference clock or matches the reference clock.

When it is determined that the vibration of the balance wheels 31 and 32 is advanced with respect to the reference clock, the controller 50 executes step S8 and outputs a delay pulse to apply a braking force to the balance wheels 31 and 32 from the control circuit 54. When the controller 50 determines that the vibration of the balance wheels 31 and 32 is delayed with respect to the reference clock, the controller 50 executes step S8 and outputs an advance pulse to apply a driving force to the balance wheels 31 and 32 from the control circuit 54. When the controller 50 determines that the vibration of the balance wheels 31 and 32 matches the reference clock and that speed governing is not necessary, the controller 50 does not output a drive pulse for speed governing.

The delay pulse and the advance pulse are speed governing control signals for setting the paired first switch 431 and fourth switch 434 to be in an on state or setting the second switch 432 and the third switch 433 to be in an on state, and are pulses having a preset fixed width in this embodiment.

In a speed governing state for governing the balance 30, the control circuit 54 of the controller 50 outputs a delay pulse or an advance pulse to the switch circuit 43 at an appropriate timing when the permanent magnet 36 of the balance wheels 31 and 32 overlaps the coil 35 and sets the first switch 431 and the fourth switch 434 to be in an on state or sets the second switch 432 and the third switch 433 to be in an on state to apply a current to the coil 35 and generate an electromagnetic force. By changing the direction of the current flowing through the coil 35, it is possible to control the suction or repulsion force of the electromagnetic force in a switching manner for the permanent magnet 36 attached to the balance wheels 31 and 32.

For this reason, it is possible to achieve deceleration by applying a braking force or achieve acceleration by applying a driving force to the balance 30. For example, the vibration of the balance wheels 31 and 32 can be decelerated by generating a suctioning electromagnetic force for the permanent magnet 36 with the vibration of the balance wheels 31 and 32 at a timing at which the permanent magnet 36 starts to separate from the coil 35. In contrast, the vibration of the balance wheels 31 and 32 can be accelerated by generating a repulsive electromagnetic force for the permanent magnet 36 at a timing at which the permanent magnet 36 starts to separate from the coil 35.

Figure 12:
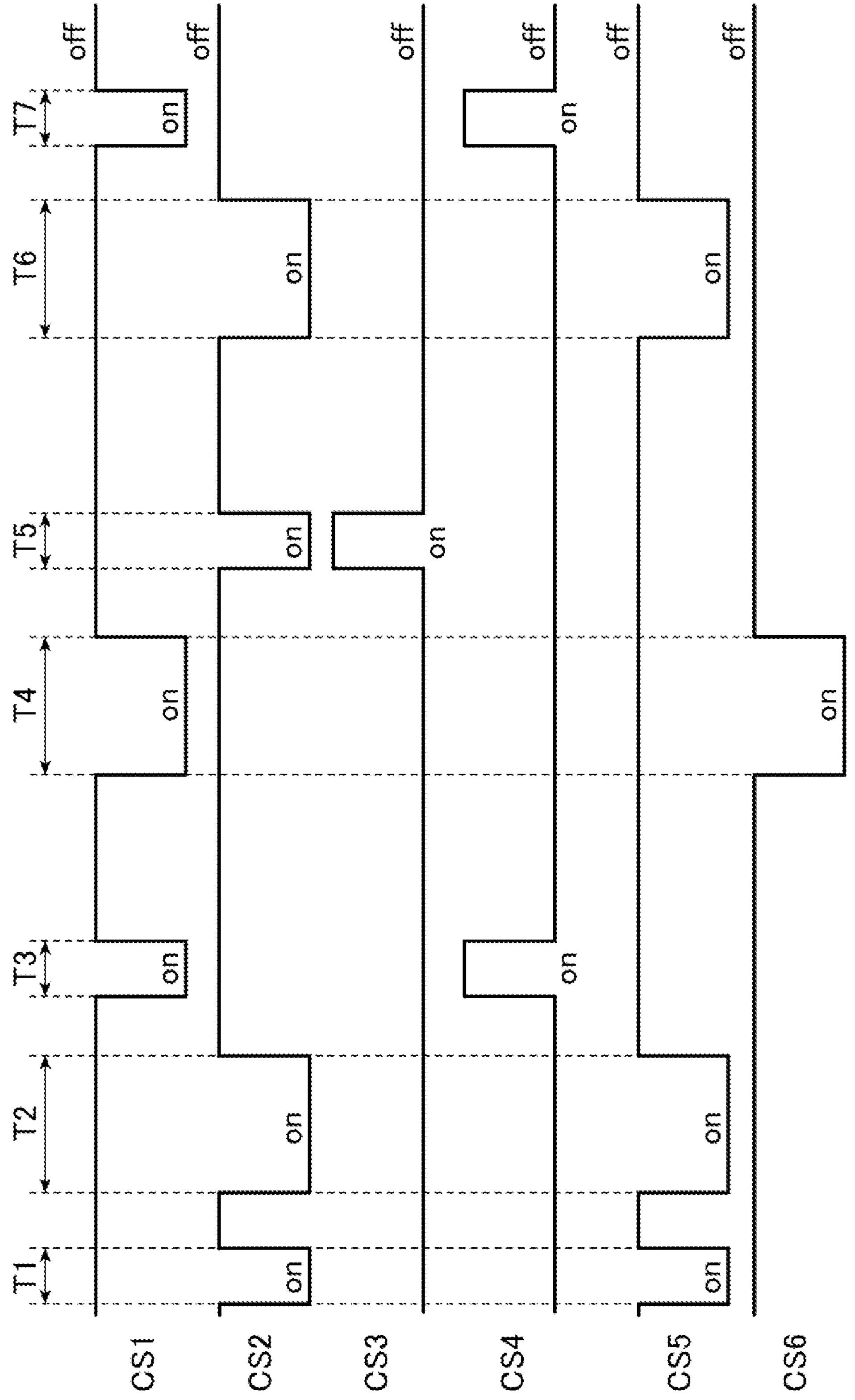
FIG. 12 is a timing chart illustrating a speed governing control signal of the mechanical timepiece.
Figure 16:
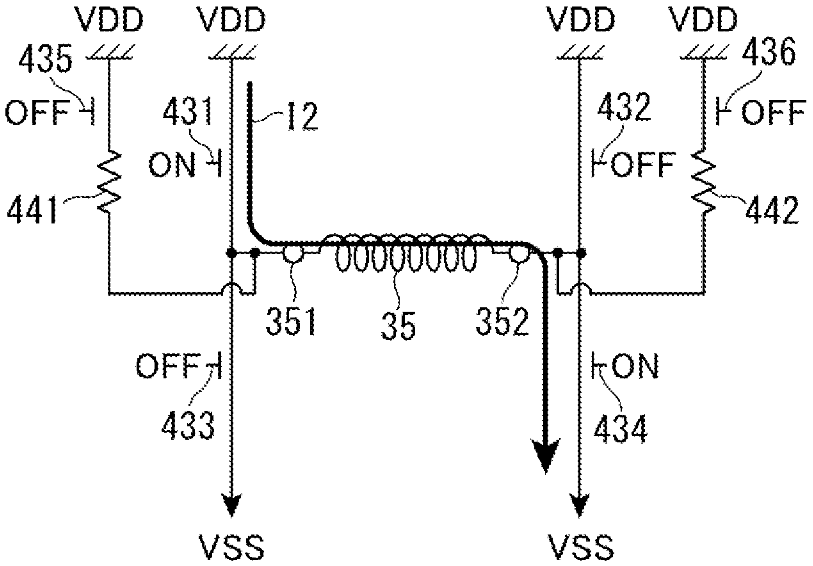
FIG. 16 is a circuit diagram illustrating an operation of the electronic speed governing apparatus of the mechanical timepiece during speed governing control.

In the timing chart illustrated in FIG. 12, the first switch 431 and the fourth switch 434 are set to be in an on state in a speed governing period T3 according to a detection result of the first vibration detection period T2 to perform speed governing control by applying a current I2 to the coil 35 as illustrated in FIG. 16.

After the speed governing period T3 elapses, the control circuit 54 outputs the control signals CS1 to CS6 for turning off the switches 431 to 436.

When the controller 50 determines in step S7 that the vibration of the balance wheels 31 and 32 matches the reference clock and after the pulse output processing in steps S8 and S9 is executed, the controller 50 returns to step S1 to continue the processing. For this reason, when an external magnetic field is not detected in the external magnetic field detection period T1, a determination result in step S1 is NO and a determination result in step S4 is NO before 10 seconds, which is the next magnetic field detection timing, elapses, and thus vibration detection processing of the balance 30 in step S6 is executed every second when a determination result in step S5 is YES. For this reason, in the timing chart illustrated in FIG. 12, the vibration detection processing of the balance 30 is executed in a vibration detection period T4 one second after the vibration detection period T2 and a vibration detection period T6 one second after the vibration detection period T4. The control circuit 54 turns on the switches 431 and 436 and turns off the other switches 432 to 435 by the control signals CS1 and CS6 in the vibration detection period T4, and turns on the switches 432 and 435 and turns off the other switches 431, 433, 434, and 436 by the control signals CS2 and CS5 in the vibration detection period T6. In this manner, the control circuit 54 alternately switches the switches to be turned on for each vibration detection period, but may turn on the same set of switches for each vibration detection period, or may perform control of alternately switching the switches for the first several times to determine a combination of switches that increases a peak value of an induced voltage waveform and then turning on the switches that increase the peak value.

When step S8 or step S9 is executed after the vibration detection periods T4 and T6, the control circuit 54 sets the first switch 431 and the fourth switch 434 to be in an on state or sets the second switch 432 and the third switch 433 to be in an on state in the speed governing periods T5 and T7 to govern the balance 30. In FIG. 12, the control circuit 54 turns on the switches 432 and 433 in the speed governing period T5 and turns on the switches 431 and 434 in the speed governing period T7, but may turn on different switches in the speed governing periods T5 and T7 depending on a comparison result in step S7. When it is determined in step S7 that the vibration of the balance wheels 31 and 32 matches the reference clock, a speed governing period during which switches are turned on does not occur.

That is, the control circuit 54 controls which switch is to be turned on in accordance with the rotational direction of the balance wheels 31 and 32 and the type of pulse output from the control circuit 54. The control circuit 54 switches all of the switches 431 to 436 to an off state in a period before the next magnetic field detection period and vibration detection period after the delay pulse or advance pulse is output to electrically decouple the first terminal 351 and the second terminal 352 of the coil 35 from the first power supply line 81 and the second power supply line 82, thereby controlling the state to an open state.

As described above, the vibration detection processing of the balance 30 and the speed governing processing of the balance 30 based on the detection result are executed at intervals of one second, and the external magnetic field detection processing is executed at intervals of 10 seconds.

A vibration detection mechanism that detects vibration of the balance 30 and outputs a vibration detection signal to the control circuit 54 includes the first detection circuit 52, the coil 35, the permanent magnet 36 held by the balance wheels 31 and 32, and the switch circuit 43.

An external magnetic field detection mechanism that detects an external magnetic field and outputs an external magnetic field detection signal to the control circuit 54 includes the coil 35 and the switch circuit 43 in addition to the second detection circuit 53.

A speed governing control mechanism that executes processing for governing the balance 30 using the permanent magnets 36 and the coil 35 as speed governing mechanisms includes the control circuit 54 that outputs the control signals CS1 to CS6 as drive pulses based on a result of comparison between a clock signal input from the oscillation circuit 51 and a vibration detection signal input from the first detection circuit 52, and the switch circuit 43 that outputs a current to the coil 35 by the control signals CS1 to CS6 to generate an electromagnetic force for speed governing.

For this reason, since the coil 35 is used not only for speed governing but also for vibration detection and external magnetic field detection, there is an advantage of downsizing and cost reduction of the mechanical timepiece 1 as compared with a case in which a dedicated vibration detection mechanism and external magnetic field detection mechanism are separately provided.

The controller 50 causes the voltage detection unit 85 to detect the voltage of the power storage unit 80 for each fixed period of time, for example, every one minute. When the voltage of the power storage unit 80 falls to or below a preset speed governing stop voltage, the controller 50 forcibly stops the supply of power to the oscillation circuit 51 to transitions to a standby mode in which the oscillation of the vibrator 90 is stopped. By transitioning to the standby mode, it is possible to hold the electric energy stored in the power storage unit 80 while suppressing energy consumption and prepare for the next start-up of the generator 60.

In the standby mode, all of the switches 431 to 436 are turned off to decouple the coil 35 from the first power supply line 81 and the second power supply line 82 and set the coil 35 to be in an open state. In this standby mode, the electronic speed governing apparatus 40 is completely stopped, and thus the mechanical timepiece 1 has the accuracy of a general mechanical timepiece which is controlled by the escape wheel 21, the pallet fork 22, and the balance 30. For this reason, the accuracy of the mechanical timepiece 1 changes from an accuracy of approximately ±0.5 seconds of a day difference, that is, approximately ±15 seconds of a month difference, which is equivalent to that of a quartz watch when the electronic speed governing apparatus 40 is operated, to an accuracy of approximately ±4 to 6 seconds of a day difference, which is equivalent to that of a general mechanical timepiece.

Effects of Embodiment

According to this embodiment, in the mechanical timepiece 1 that moves hands by operating the train wheel 20 with the spring 12 and governs the speed with the escape wheel 21, the pallet fork 22 and the balance 30, the vibration of the balance 30 can be governed based on a result of comparison between a vibration detection signal for detecting the vibration of the balance 30 as a speed governor and a clock signal from the vibrator 90, and thus the time accuracy of the mechanical timepiece 1 can be improved to the level of a quartz watch. When the presence or absence of an external magnetic field is detected, the content of speed governing processing of the balance 30 is changed in accordance with a detection result of the external magnetic field, and the external magnetic field is detected, speed governing control is stopped because there is a possibility that the vibration of the balance 30 will be erroneously detected, and thus the speed governing control can be performed without being affected by external magnetic field noise.

When the electric energy of the power storage unit 80 is reduced and the electronic speed governing cannot be performed due to the voltage reduced to a voltage equal to or lower than a speed governing stop voltage, the switch circuit 43 is set to be in an off state to switch the state to a stop state in which the coil 35 is decoupled from the first and second power supply lines 81 and 82, and thus it is possible to reliably prevent the coil 35 from affecting mechanical speed governing of the balance 30. For this reason, in the stop state of the speed governing control, the time accuracy indicated by hands can be maintained at the accuracy of general mechanical timepieces, and the time accuracy can be prevented from being significantly reduced.

The control circuit 54 sets the switch circuit 43 to be in an off state also in a period before the next detection period after a delay pulse or an advance pulse is output, and thus it is possible to prevent the coil 35 from affecting the mechanical speed governing of the balance 30.

The speed governing of the balance 30 is performed using the permanent magnet 36 provided at the balance wheels 31 and 32 and the coil 35 that generates an electromagnetic force with a current supplied thereto, and thus decelerating speed governing through application of a braking force to the balance 30 and accelerating speed governing through application of a driving force to the balance 30 can be executed. In particular, the balance 30 can be accelerated, and thus speed governing can be performed in a region where a torque of the spring 12 is small, that is, a period in which a rewinding speed is low.

For this reason, it is possible to extend the duration for which the mechanical timepiece 1 can be governed using the spring 12. That is, when the speed governing of the balance 30 is controlled with a braking force and a driving force, the speed governing can be controlled up to a region where a rewinding torque decreases. For this reason, the mechanical timepiece 1 can extend the duration for which it can be driven with the accuracy of a quartz watch.

Since the switch circuit 43 is constituted by a bridge circuit including four switches 431 to 434, the control circuit 54 can easily change the direction of a current flowing through the coil 35, selectively apply a braking force and a driving force to the permanent magnet 36 through simple control, and achieve the speed governing control of the advance and delay of the balance 30 with a simple circuit configuration.

The control circuit 54 can easily control and switch a vibration detection state, a speed governing state, an external magnetic field detection state, and a stop state by appropriately setting on states and off states of the switches 431 to 436.

The switch circuit 43 includes the first resistance element 441 and the fifth switch 435, and the second resistance element 442 and the sixth switch 436, and the control circuit 54 perform control such that a current flowing through the coil 35 flow through one of the first resistance element 441 and the second resistance element 442 when an external magnetic field is detected or a vibration is detected. Thus, it is possible to increase a detection voltage when a vibration is detected or an external magnetic field is detected, and improve the detection accuracy of the first detection circuit 52 or the second detection circuit 53.

The first resistance element 441 and the fifth switch 435 coupled to the first terminal 351 of the coil 35 and the second resistance element 442 and the sixth switch 436 coupled to the second terminal 352 are provided, and the switches 435 and 436 are alternately coupled in each external magnetic field detection period. Thus, even when an external magnetic field cannot be detected in the first external magnetic field detection period depending on the direction of an external magnetic field, a possibility that an external magnetic field can be detected in the next external magnetic field detection period is increased, and the detection accuracy of the external magnetic field can be improved.

Since the dedicated generator 60 is provided, power generation performance can be improved and adjustment control can be performed with high accuracy as compared with a case in which the permanent magnet 36 and the coil 35, which are speed governing mechanisms, are also used as generators.

Modification Example

The present disclosure is not limited to the embodiment, and various modifications may be made within the scope of the present disclosure.

For example, control may be performed such that the advance or delay of the balance 30 is recovered by storing a non-execution period of speed governing control through the detection of an external magnetic field and increasing the frequency of a speed governing operation after an external magnetic field is no longer detected. That is, it is only required that vibration detection of the balance 30 is performed every second and a drive pulse for speed governing is output during normal control in which an external magnetic field is not detected, and that vibration detection and speed governing control may be performed, for example, twice per second during a recovery operation after speed governing control through the detection of an external magnetic field is not performed. As an example, when there is a non-execution period of speed governing control for 60 seconds, the speed governing control scheduled to be performed 60 times for 60 seconds may be executed through a recovery operation. For example, when speed governing control is performed twice per second, an execution period in which a recovery operation is performed with 60 corrections is 30 seconds.

When a predetermined period of time or more elapses from the non-execution period of the speed governing control, a deviation amount of a vibration cycle of the balance 30, that is, a correction amount changes from the beginning due to a posture difference, the temperature, or the like of the mechanical timepiece 1. Thus, the recovery operation may be executed for, for example, a maximum of 30 minutes after a magnetic field is no longer detected.

The content of the speed governing control of the balance when an external magnetic field is detected is not limited to a configuration in which vibration detection processing and speed governing control are not executed in a first period, specifically, until the next external magnetic field detection timing comes as in the embodiment, and the speed governing control capable of reducing the influence of an external magnetic field may be performed. For example, an interval of execution of the vibration detection processing when an external magnetic field is detected may be made shorter than that when an external magnetic field is not detected, an interval of a detection timing of a waveform detected exceeding a first threshold value by the first detection circuit 52 during a vibration detection period may be measured, and a vibration detection signal and external magnetic field noise are discriminated to perform speed governing control.

Although the two switches 435 and 436 and the two resistance elements 441 and 442 are provided in the switch circuit 43 in order to detect a vibration and an external magnetic field, only one switch and one resistance element coupled in series may be provided. When only one resistance element is provided, the switch circuit 43 can be made small.

The switches 435 and 436 and the resistance elements 441 and 442 may be disposed between the first and second terminals 351 and 352 and the second power supply line 82.

A temperature sensor may be mounted on the mechanical timepiece 1, and temperature correction reflected in speed governing control may be performed using temperature correction data based on temperature characteristic data of the balance spring 34, the vibrator 90, or the like which is stored in a nonvolatile storage mechanism in advance. Since a spring force of the balance spring 34 and the moment of inertia of the balance wheels 31 and 32 change due to expansion and contraction of components caused by changes in temperature, a period of time from when the vibration of the balance 30 is detected to when a drive pulse is output may be changed depending on a measured temperature.

In the above-described embodiment, a vibration detection timing is set to an interval of one second, and a drive pulse for speed governing is output after the vibration detection timing. However, the output of the drive pulse may be maintained at intervals of one second, and the vibration detection timing may be set to an interval shorter than one second. For example, when the balance 30 has six vibrations, an accurate correction amount can be calculated by comparing the timing of a vibration detection signal that appears six times per second with the timing of a reference clock. Control may be performed such that, when the vibration detection signal is ahead of the reference clock, a current is applied to the coil 35 at a timing when a braking force is applied to the balance 30, and conversely, when the vibration detection signal is behind the reference clock, a current is supplied to the coil 35 with a phase and at a timing when a driving force is applied to the balance 30. However, since electric energy is consumed also at the time of vibration detection, energy consumption can be reduced by performing vibration detection at intervals of one second.

The generator is not limited to the generator 60 in which the power generation rotor 61 is attached to the balance stem 33 as in the embodiment. For example, a generator including a power generation rotor having a pinion driven by the train wheel 20 may be used. The permanent magnet 36 provided in the balance 30 and the coil 35 may also be used as a generator. Further, the generator may be a solar panel or may be a generator including a rotor rotated by an oscillating weight, or a wireless charging mechanism using electromagnetic induction from an external charger may be used. When these generators that do not use mechanical energy of the spring 12 are used, mechanical energy is not consumed for power generation, and thus a duration can be extended to that extent and speed governing control of the balance 30 can be easily performed.

The balance 30 is not limited to a configuration including the two balance wheels 31 and 32, but may have a configuration including one balance wheel.

The coil 35 may be attached to the balance wheel, and the permanent magnet 36 may be fixed to the movement side. For example, the coil 35 may be attached to one balance wheel, and the permanent magnets 361 to 364 may be disposed and paired with the balance wheel therebetween.

The number of permanent magnets 36 is not limited to four. In particular, when a generator is separately provided and the coil 35 is not used for power generation but used for the speed governing and vibration detection of the balance 30, it is only required that at least one permanent magnet is provided. In this case, the coil 35 is not limited to being disposed between the balance wheels 31 and 32, but may be disposed on the outer periphery side of the balance 30 or the dial side or the back lid side of the balance 30.

In the embodiment described above, the coil 35 serves as the vibration detection coil, the external magnetic field detection coil, and the speed governing control coil, but a coil for detecting vibration and an external magnetic field and a coil for controlling speed governing may be separately provided. Further, the vibration detection coil, the external magnetic field detection coil, and the speed governing control coil may be separately provided. In this manner, when the coils are formed as separate bodies, the maximum performance of each of the coils can be obtained by setting coil specifications with an optimized number of times of winding, wire diameter, and the like according to the use.

Further, a plurality of speed governing control coils may be provided. For example, a vibration detection coil may be disposed at an intermediate position of the vibration of the balance wheels 31 and 32, and the speed governing control coils may be disposed on the right and left sides with the vibration detection coil therebetween.

The control circuit 54 outputs a delay pulse and advance pulse with a fixed pulse width as a speed governing control signal, but a braking force and a driving force may be adjusted by adjusting pulse widths of the delay pulse and the advance pulse in accordance with an advance amount and a delay amount of a vibration detection signal with respect to a clock signal.

In the embodiment described above, when the voltage of the power storage unit 80 is set to be equal to or smaller than a speed governing stop voltage, speed governing control is switched to a stop state by turning off all of the switches 431 to 436 for coupling the coil 35 to the first power supply line 81 and the second power supply line 82, but the stop state may be set, for example, by disposing a high resistor between the coil 35 and the first and second power supply lines 81 and 82. Specifically, it is only required that the stop state is a state in which no electromagnetic force is generated in the coil 35 by applying no current or only as little current as possible to the coil 35, or a state in which no influence is exerted on the operation of the balance 30 by generating only a slight electromagnetic force that does not affect the speed governing control.

Overview of Present Disclosure

A mechanical timepiece of the present disclosure includes a spring, a balance configured to be driven by power from the spring, an oscillation circuit configured to output a clock signal, a speed governing mechanism configured to include a permanent magnet and a coil, one of the permanent magnet and the coil being held by the balance, an external magnetic field detection mechanism configured to detect an external magnetic field by the coil, a vibration detection mechanism configured to detect vibration of the balance and output a vibration detection signal, a speed governing control mechanism configured to output a drive pulse in accordance with a result of comparison between the clock signal and the vibration detection signal, output a current to the coil by the drive pulse to generate an electromagnetic force, and cause the generated electromagnetic force to act on the permanent magnet to perform processing for governing the balance, a power storage mechanism configured to store electric energy to be supplied to the speed governing control mechanism, and a generator configured to generate the electric energy. The speed governing control mechanism changes a processing content of the speed governing of the balance in accordance with a detection result of the external magnetic field.

According to the mechanical timepiece of the present disclosure, the vibration of the balance can be governed based on a result of comparison between the vibration detection signal for detecting the vibration of the balance and the clock signal, and thus the time accuracy of the mechanical timepiece can be improved to the level of a quartz watch. Since the presence or absence of an external magnetic field is detected, the content of speed governing processing of the balance can be changed in accordance with a detection result of the external magnetic field, and it is possible to perform speed governing control in which the influence of external magnetic field noise is reduced by stopping the speed governing control when there is a possibility that the vibration of the balance will be erroneously detected due to the external magnetic field.

Further, the speed governing of the balance is performed using the permanent magnet and the coil that generates an electromagnetic force with a current supplied thereto, and thus decelerating speed governing through application of a braking force and accelerating speed governing through application of a driving force to the balance can be executed. In particular, the balance can be accelerated, and thus speed governing can be performed in a region where a torque of the spring is small, that is, a period in which a rewinding speed is low. For this reason, it is possible to extend the duration for which the mechanical timepiece can be governed using the spring.

In the mechanical timepiece of the present disclosure, a first power supply line and a second power supply line that supply the electric energy to the speed governing control mechanism from the power storage mechanism may be provided, the speed governing control mechanism may include a first switch coupled between a first terminal of the coil and the first power supply line, a second switch coupled between a second terminal of the coil and the first power supply line, a third switch coupled between the first terminal of the coil and the second power supply line, and a fourth switch coupled between the second terminal of the coil and the second power supply line, the first switch, the second switch, the third switch, and the fourth switch may be transistors, and the speed governing control mechanism may execute the processing for governing the balance by controlling the first switch, the second switch, the third switch, and the fourth switch.

Since the speed governing control mechanism is configured to include a bridge circuit including four switches, it is possible to change the direction of a current flowing through the coil through simple control, to selectively apply a braking force and a driving force to the permanent magnet, and to achieve the speed governing control of advance and delay of the balance with a simple circuit configuration.

In the mechanical timepiece of the present disclosure, the external magnetic field detection mechanism may include a fifth switch and a first resistance element that are coupled in series between the first terminal and the first power supply line, and may execute processing for performing control of turning on the fifth switch to detect the external magnetic field.

According to this configuration, the external magnetic field detection mechanism can also apply a current flowing through the coil due to the external magnetic field to the first resistance element by turning on the fifth switch, and thus it is possible to obtain a larger detection voltage than when the resistance element is not provided and to improve detection sensitivity. For this reason, even a minute external magnetic field can be detected.

In the mechanical timepiece of the present disclosure, the external magnetic field detection mechanism may include a sixth switch and a second resistance element that are coupled in series between the second terminal and the first power supply line, and may execute processing for performing control of alternately turning on the fifth switch and the sixth switch to detect the external magnetic field.

The external magnetic field detection mechanism alternately executes processing for performing control of turning on the fifth switch to detect an external magnetic field and processing for performing control of turning on the sixth switch to detect an external magnetic field. Thus, even when it is difficult to detect the external magnetic field when control of turning on one switch by the direction of the external magnetic field is performed, a possibility that the external magnetic field will be detected by performing control of turning on the other switch increases, and thus the detection accuracy of the external magnetic field can be improved.

In the mechanical timepiece of the present disclosure, the vibration detection mechanism may include the fifth switch and the first resistance element that are coupled in series between the first terminal and the first power supply line.

According to this configuration, when control of turning on the fifth switch is performed at a timing when the permanent magnet relatively overlaps the coil, the fifth switch functions as a vibration detection mechanism, and when control of turning on the fifth switch is performed at a timing when the permanent magnet does not relatively overlap the coil, the fifth switch can function as a magnetic field detection mechanism. Thus, the fifth switch and the first resistance element can be used as both an external magnetic field detection unit and a vibration detection mechanism.

In the mechanical timepiece of the present disclosure, the speed governing control mechanism may perform control of turning off the first switch, the second switch, the third switch, and the fourth switch during a period other than a detection period of the external magnetic field, a vibration detection period, and an output period of the drive pulse.

According to this configuration, the coil terminal can be decoupled from the power supply lines to be in an open state, that is, a high impedance state except for the detection periods and the output period of the drive pulse. For this reason, it is possible to prevent a current from flowing through the coil to generate a magnetic field during a vibration motion of the balance due to a balance spring and affecting the vibration of the balance.

In the mechanical timepiece according to the present disclosure, when the external magnetic field detection mechanism detects the external magnetic field, the speed governing control mechanism may stop the processing for governing the balance during a first period.

Since the speed governing processing of the balance is stopped during the first period when the external magnetic field is detected, it is possible to prevent erroneous detection of the vibration of the balance due to the influence of the external magnetic field and prevent erroneous speed governing control.

In the mechanical timepiece of the present disclosure, the external magnetic field detection mechanism may execute processing for detecting the external magnetic field after the elapse of the first period, and the speed governing control mechanism may further stop the processing for governing the balance during the first period when the external magnetic field detection mechanism detects the external magnetic field, and may restart the processing for governing the balance when the external magnetic field detection mechanism does not detect the external magnetic field.

Since an external magnetic field is detected every time the first period elapses, the speed governing processing of the balance is stopped during the first period while the external magnetic field is detected even when the external magnetic field exerts an influence for a long period of time, and thus it is possible to reliably prevent erroneous detection of the vibration of the balance due to the influence of the external magnetic field and prevent erroneous speed governing control.

The mechanical timepiece of the present disclosure may further include a storage unit configured to store a period during which the processing for governing the balance is stopped. The speed governing control mechanism may reduce an interval of output of the drive pulse in accordance with the period stored in the storage unit when the processing for governing the balance is restarted. The interval of output of the drive pulse is reduced in accordance with a stop period of the speed governing processing of the balance, and thus it is possible to recover an indication deviation of the time due to the accuracy deterioration during the stop period in a short period.

In the mechanical timepiece of the present disclosure, the generator may be an electromagnetic generator including a power generation rotor that rotates through a train wheel with power from the spring, and a power generation coil that generates power by rotation of the power generation rotor.

Since the dedicated generator including the power generation rotor and the power generation coil is provided, it is possible to improve power generation performance and reduce the influence on the speed governing control of the balance.

In the mechanical timepiece of the present disclosure, the generator may be an electromagnetic generator including the permanent magnet and the coil and configured to generate power through a relative movement of the permanent magnet and the coil by vibration of the balance.

Since the permanent magnet and the coil for vibration detection can also be used for power generation, it is possible to reduce the number of components and reduce the cost as compared with a case in which a dedicated generator is separately provided.

What is claimed is:

1. A mechanical timepiece comprising:
- a spring;
- a balance configured to be driven by power from the spring;
- an oscillation circuit configured to output a clock signal;
- a speed governing mechanism including a permanent magnet and a coil, one of the permanent magnet and the coil being held by the balance;
- an external magnetic field detection mechanism configured to detect an external magnetic field by the coil;
- a vibration detection mechanism configured to detect vibration of the balance and output a vibration detection signal;
- a speed governing control mechanism configured to output a drive pulse in accordance with a result of comparison between the clock signal and the vibration detection signal, output a current to the coil by the drive pulse to generate an electromagnetic force, and cause the generated electromagnetic force to act on the permanent magnet to perform processing for governing the balance;
- a power storage mechanism configured to store electric energy to be supplied to the speed governing control mechanism; and
- a generator configured to generate the electric energy,
- wherein the speed governing control mechanism is configured to change a processing content of the speed governing of the balance in accordance with a result of the detection of the external magnetic field.

2. The mechanical timepiece according to claim 1, wherein
- a first power supply line and a second power supply line configured to supply the electric energy to the speed governing control mechanism from the power storage mechanism are provided, the speed governing control mechanism includes:

a first switch coupled between a first terminal of the coil and the first power supply line;

a second switch coupled between a second terminal of the coil and the first power supply line;

a third switch coupled between the first terminal of the coil and the second power supply line; and a fourth switch coupled between the second terminal of the coil and the second power supply line, the first switch, the second switch, the third switch, and the fourth switch are transistors, and the speed governing control mechanism is configured to execute the processing for governing the balance by controlling the first switch, the second switch, the third switch, and the fourth switch.

3. The mechanical timepiece according to claim 2, wherein the external magnetic field detection mechanism includes a fifth switch and a first resistance element that are coupled in series between the first terminal and the first power supply line, and is configured to execute processing for performing control of turning on the fifth switch, to detect the external magnetic field.

4. The mechanical timepiece according to claim 3, wherein the external magnetic field detection mechanism includes a sixth switch and a second resistance element that are coupled in series between the second terminal and the first power supply line, and is configured to execute processing for performing control of alternately turning on the fifth switch and the sixth switch, to detect the external magnetic field.

5. The mechanical timepiece according to claim 3, wherein the vibration detection mechanism includes the fifth switch and the first resistance element that are coupled in series between the first terminal and the first power supply line.

6. The mechanical timepiece according to claim 5, wherein the speed governing control mechanism is configured to perform control of turning off the first switch, the second switch, the third switch, and the fourth switch during a period other than a detection period of the external magnetic field, a vibration detection period, and an output period of the drive pulse.

7. The mechanical timepiece according to claim 1, wherein when the external magnetic field detection mechanism detects the external magnetic field, the speed governing control mechanism stops the processing for governing the balance during a first period.

8. The mechanical timepiece according to claim 7, wherein the external magnetic field detection mechanism is configured to execute processing for detecting the external magnetic field after elapse of the first period, and the speed governing control mechanism further stops the processing for governing the balance during the first period when the external magnetic field detection mechanism detects the external magnetic field, and restarts the processing for governing the balance when the external magnetic field detection mechanism does not detect the external magnetic field.

9. The mechanical timepiece according to claim 8, further comprising:

a storage unit configured to store a period during which the processing for governing the balance is stopped, wherein the speed governing control mechanism reduces an interval of output of the drive pulse in accordance with the period stored in the storage unit, when the processing for governing the balance is restarted.

10. The mechanical timepiece according to claim 1, wherein the generator is an electromagnetic generator including a power generation rotor configured to rotate through a train wheel with power from the spring, and a power generation coil configured to generate power by rotation of the power generation rotor.

11. The mechanical timepiece according to claim 1, wherein the generator is an electromagnetic generator including the permanent magnet and the coil and configured to generate power through a relative movement of the permanent magnet and the coil by vibration of the balance.

* * * * *